US008532865B2

(12) United States Patent
Suzuki et al.

(10) Patent No.: US 8,532,865 B2
(45) Date of Patent: Sep. 10, 2013

(54) APPARATUS AND SYSTEM FOR DIAGNOSING DEVICES INCLUDED IN WORKING MACHINE

(75) Inventors: Hideaki Suzuki, Hitachi (JP); Yoshinori Furuno, Tsuchiura (JP); Kouichi Shibata, Kasumigaura (JP); Hiroshi Watanabe, Ushiku (JP); Yutaka Watanabe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 908 days.

(21) Appl. No.: 12/532,001

(22) PCT Filed: Aug. 11, 2008

(86) PCT No.: PCT/JP2008/064405

§ 371 (c)(1), (2), (4) Date: Sep. 18, 2009

(87) PCT Pub. No.: WO2009/020229

PCT Pub. Date: Feb. 12, 2009

(65) Prior Publication Data

US 2010/0070130 A1 Mar. 18, 2010

(30) Foreign Application Priority Data

Aug. 9, 2007 (JP) ................................ 2007-207340

(51) Int. Cl.
*G06F 7/00* (2006.01)

(52) U.S. Cl.
USPC ........................................................ 701/29.1

(58) Field of Classification Search
USPC ........................................................ 701/35
See application file for complete search history.

(56) References Cited

U.S. PATENT DOCUMENTS 6,766,232 B1 * 7/2004 Klausner ...................... 701/32.9
2002/0046048 A1 4/2002 Fukushima et al.

FOREIGN PATENT DOCUMENTS

| | | | |
|---|---|---|---|
| JP | 2002-23831 | A | 1/2002 |
| JP | 2002-73153 | A | 3/2002 |
| JP | 2002-217811 | A | 8/2002 |
| JP | 2003-516275 | A | 5/2003 |
| JP | 2005-4658 | A | 1/2005 |
| JP | 2005-163754 | A | 6/2005 |
| JP | 2005-180225 | * | 7/2005 |
| JP | 2005-180255 | A | 7/2005 |
| JP | 2006-260207 | A | 9/2006 |

* cited by examiner

*Primary Examiner* — Thomas Tarcza
*Assistant Examiner* — MacEeh Anwari
(74) *Attorney, Agent, or Firm* — Mattingly & Malur, PC

(57) ABSTRACT

A device diagnostic apparatus (201) comprising: data judgment means (101) for, when device information (121) including operating condition information and internal state information is inputted, comparing the operating condition information of the device information with operating condition information stored in a database (111) beforehand to judge whether or not both of the operating condition information agree with each other, and then outputting judgment result information; and state diagnosis means (103) for, when the judgment result information indicates that both of the operating condition information agree with each other, comparing the internal state information in the device information with internal state information stored in the database beforehand, and then outputting the result of the comparison. This makes it possible to reduce the possibility that false judgment result will be output, and to achieve the efficiency of maintenance work.

17 Claims, 22 Drawing Sheets

APPARATUS AND SYSTEM FOR DIAGNOSING DEVICES INCLUDED IN WORKING MACHINE

TECHNICAL FIELD

The present invention relates to a device diagnostic apparatus, and a device diagnostic system, for diagnosing each of devices included in a working machine.

BACKGROUND ART

Construction machines such as a large-size hydraulic excavator which operates in a mine or the like, and other working machines, are often required to continuously operate 24 hours per day and 365 days per year with almost no stopping. In such a case, before a machine is abnormally stopped, it is necessary to keep devices in perfect conditions by subjecting them to maintenance work beforehand. In general, a specialized maintenance person periodically performs inspection based on inspection work to check whether or not an abnormal state has occurred in any of the devices. If an abnormal state is detected, required maintenance work is performed to maintain the device in a good condition.

On the other hand, the devices need to be stopped for inspection and maintenance work. Therefore, for an operation manager who wants to continuously operate the devices, the inspection and maintenance work will often be troublesome for operation while the devices operates normally.

In recent years, as is the case with a flight recorder of an airplane, a recorder is sometimes provided (a drive recorder; refer to patent document 1) on the main body of devices so that the recorder is made full use of in various ways. Various kinds of sensors are provided for the devices. Accordingly, inspection work to check whether or not maintenance work is required can be achieved by checking internal state information about the devices, which is output by the sensors. Heretofore, alarm information is usually output by a diagnostic circuit inside a device. However, at the moment when such alarm information is issued, a device state may have already become worse and, in the worst case, the operation of the device may stop. However, when an inspection is made by use of sensor information recorded in a recorder, the state that the device has failed can be known before the operation of the device stops. This makes it possible to make a maintenance plan. Recently, a diagnostic apparatus in which various kinds of sensor information recorded by a recorder is subjected to data processing by a computer is achieving widespread use.

As a processing method for processing the time series data, there are methods described in patent documents 2, 3. According to the method described in the patent document 2, a state which differs from a normal state is detected for the purpose of detecting illegal entrance into a computer network. According to the method described in the patent document 3, whether or not a movable body is in a moving state or in a stationary state is detected from a state of a radio wave at a communications terminal of the movable body.

In addition, patent document 4 proposes a technique in which diagnosis of a device is learned so as to make use of the learned diagnosis for the detection of an abnormal state.

Moreover, for example, patent documents 5, 6 describe a fault diagnostic apparatus of a working machine such as a hydraulic excavator. According to the patent document 5, the fault diagnosis includes the steps of: detecting, by each sensor, the state quantity relating to an operating state of an engine cooling water system of a hydraulic excavator; recording, as state quantity data, the state quantity detected by each sensor; comparing the recorded state quantity data with a specified reference value range corresponding to the state quantity data; and if the state quantity data is not within the reference value range, judging the state quantity data to be an abnormal state. According to the patent document 6, the processing includes the steps of: recording information, which are detected by each sensor for detecting the state quantity relating to an operating state of an intake and exhaust system of an engine, in a data recording device as input operation data, the information including intercooler inlet pressure, intercooler outlet pressure, an intercooler inlet temperature, intercooler outlet temperature, exhaust gas temperature of the engine, outdoor air temperature, engine speed, and a throttle position; recording, in the data recording device, comparison data to be compared with operation data; inputting the operation data and the comparison data, which have been recorded in the data recording device, into a display controller; and outputting the operation data and the comparison data on a display unit as display signals.

Patent document 1: JP, A 2002-73153
Patent document 2: JP, A 2005-4658
Patent document 3: JP, A 2002-217811
Patent document 4: JP, A 2003-516275
Patent document 5: JP, A 2005-180225
Patent document 6: JP, A 2005-163754

DISCLOSURE OF THE INVENTION

Problems to be Solved by the Invention

For the methods described in the patent documents 2 and 3, if a working machine such as a hydraulic excavator is used, a change point at which a state changes is not clear; and a device state changes in various ways depending on operating environment conditions. Therefore, when a target whose state is difficult to judge only by partially checking time series information is inspected, the processing method for processing the time series information has a problem.

According to the patent document 4, because a learning function works only for an alarm set inside the device beforehand, an unknown abnormal state cannot be handled. Accordingly, there is a possibility that a false diagnosis will be made.

The patent documents 5 and 6 do not take into consideration the influence of the other state quantity for state quantity data used for abnormal state diagnosis. Therefore, also in this case, there is a possibility that a false diagnosis will be made.

An object of the present invention is to provide a device diagnostic apparatus and a device diagnostic system for diagnosing devices of a working machine which are capable of reducing the possibility that false judgment result will be output, and capable of achieving the efficiency of maintenance work.

Means for Solving the Problems

In order to achieve the above-described object, the present invention provides a device diagnostic apparatus of a working machine which includes a body, and a work device provided on the body. The device diagnostic apparatus diagnoses, as a target device, at least one of components included in the working machine. The device diagnostic apparatus includes data judgment means for, when device information including operating condition information and internal state information is inputted, comparing the operating condition information in the device information with operating condition information stored beforehand to judge whether or not both of the operating condition information agree with each other, and then outputting judgment result information, the operating condition information including external environment information of the target device and operation information of the target device, and the internal state information including operation state information of the target device; and state diagnosis means for, when the judgment result information indicates that both of the operating condition information agree with each other, comparing the internal state information in the device information with internal state information stored beforehand, and then outputting the result of the comparison.

Effects of the Invention

According to the present invention, it is possible to reduce the possibility that false judgment result will be output, and to achieve the efficiency of maintenance work.

DESCRIPTION OF REFERENCE NUMBERS

Figure 1:
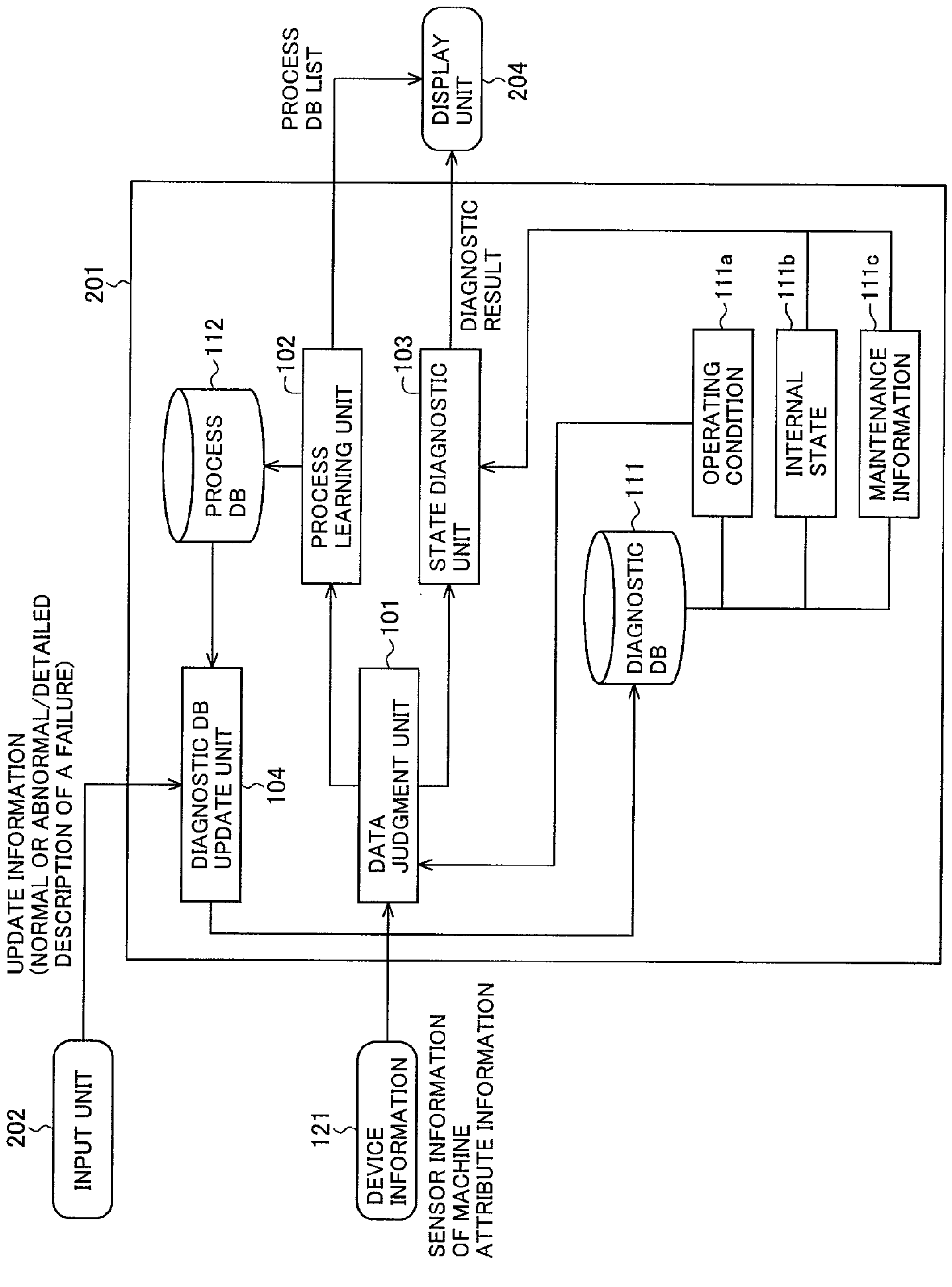
FIG. 1 is a diagram illustrating a device diagnostic system according to one embodiment of the present invention.

1 Hydraulic excavator
2 Track body
3 Swing body
4 Cabin
5 Front work device
6 Boom
7 Arm
8 Bucket
9 Data recording device
11 Personal computer
11A Personal computer main body
11B Display unit
11C Mouse
11D Keyboard
12 Server
13 Radio equipment
14 Communication satellite
15 Base station
16 Internet
21 Engine controller
22 Vehicle body controller
23 Monitor controller
24 Hydraulic system measurement unit
25 Engine measurement unit
27A First common communication line
27B Second common communication line
28 Electronic governor
29A, 29B Electric lever units
31 Display unit
32 Operation unit
40 Engine
41 Pump mission unit
42 Container
43 Oil pan
44 Upper oil accumulator
45 Suction unit
46 Oil filter
47 Gear pump
48 Mission oil cooler
51 through 53 Temperature sensors
55 Tank
56*a*, 56*b* Control valves

57 Actuator
58 Hydraulic operating fluid cooler
59 Drain pipe
60 Relief valve
61 Fan motor
62 Auxiliary pump
64 Solenoid valve
65, 68 Pressure sensors
66, 67, 69 Temperature sensors
71 Engine main body
72 Turbocharger
73*a*, 73*b* After-coolers
75 Radiator
76 LTA radiator
77 Coolant pump
79 Fan motor
82 through 85 Temperature sensors
86, 87 Pressure sensor
89 Tilt sensor
101, 101A Data judgment unit
102 Process learning means
103, 103A State diagnosis means
104 Diagnostic database update unit
111 Diagnostic database
111*a* Operating condition data storage unit
111*b* Internal state data storage unit
111*c* Maintenance information data storage unit
112 Process database
120 Attribute information database
121 Device information (sensor information and attribute information)
121A Sensor information
121B Attribute information
201, 201A, 201B Device diagnostic apparatus
202 Input unit
204 Display unit
P1, P2, P3 Main pumps

BEST MODES FOR CARRYING OUT THE INVENTION

Each embodiment will be described below with reference to drawings.

First Embodiment

A diagnostic apparatus according to one embodiment of the present invention will be described below with reference to FIGS. 1 through 16.

According to this embodiment, various kinds of components included in a working machine (for example, a hydraulic excavator) such as a construction machine are described as target devices to be diagnosed.

FIG. 1 is a diagram illustrating a configuration of a device diagnostic system according to this embodiment. The device diagnostic system includes a device diagnostic apparatus 201, an input unit 202, and a display unit 204. The device diagnostic apparatus 201 includes a data judgment unit 101, a process learning unit 102, a state diagnostic unit 103, a diagnostic database update unit 104, a diagnostic database 111, and a process database 112.

Figure 4:
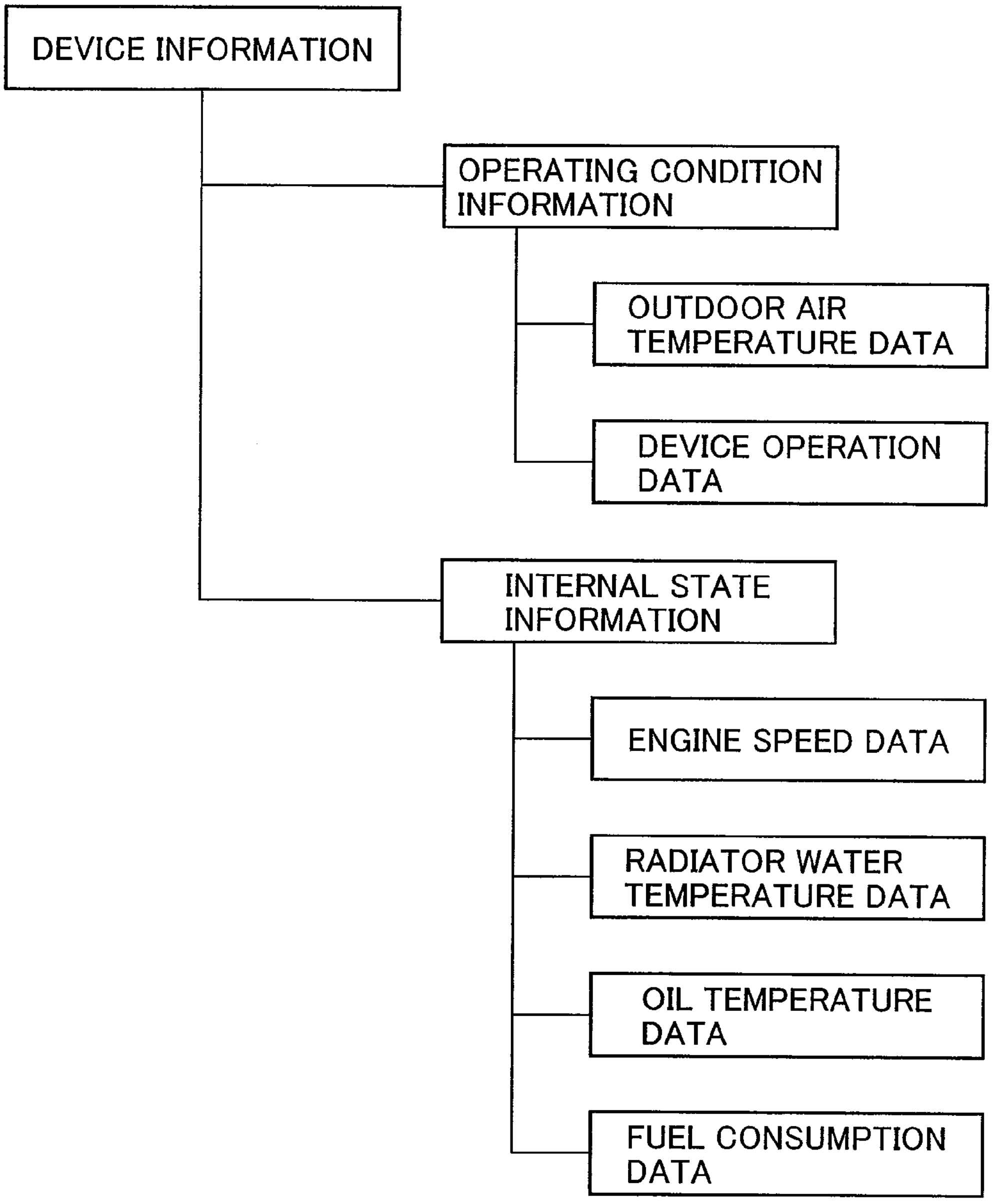
FIG. 4 is a diagram illustrating an example of device information according to one embodiment of the present invention.

First of all, the data judgment unit 101 receives device information 121 to be input from the outside. The device information 121 indicates a state of a target device to be diagnosed. The inputted device information 121 includes operating condition information and internal state information. As shown in FIG. 4, the operating condition information includes external environment information of the target device, operation information of the target device, and information about the operation of the target device, and indicates conditions such as environment and way under which the target device has been operated. For example, the operating condition information includes: outdoor air temperature data, device operation data, humidity data, meteorological data such as weather data and road surface data indicating a state of a road surface, operation data such as how an accelerator is stepped, and the roughness of operation, driver data such as the distinction of, age, and a skill level, and the like. The internal state information is operation state information which indicates how the target device has been moved under the above-described operating conditions. To be more specific, the internal state information includes sensor information by various kinds of sensors provided in the target device. For example, the sensor information includes engine speed data, radiator water temperature data, oil temperature data, fuel consumption data, sound data about the sound generated by the target device, vibration data, and the like.

The data judgment unit 101 into which the device information 121 has been inputted refers to the diagnostic database 111. The diagnostic database 111 is constituted of an operating condition data storage unit 111*a*, an internal state data storage unit 111*b*, and a maintenance information data storage unit 111*c*. The operating condition data storage unit 111*a* and the internal state data storage unit 111*b* stores, respectively, the operating condition information and the internal state information, both of which are included in the device information 121.

Incidentally, the operating condition information stored in the operating condition data storage unit 111*a* and the internal state information stored in the internal state data storage unit 111*b* are stored with associated manner with each other. In addition, maintenance information stored in the maintenance information data storage unit 111*c* is associated with the operating condition information stored in the operating condition data storage unit 111*a* and the internal state information stored in the internal state data storage unit 111*b*.

The data judgment unit 101 searches whether the operating condition data storage unit 111*a* in which the operating condition information has been stored beforehand includes information that agrees with operating condition information in the inputted device information 121. To be more specific, the data judgment unit 101 compares the operating condition information in the inputted device information 121 with the operating condition information stored beforehand in the operating condition data storage unit 111*a* to judge whether or not both of the operating condition information agree with each other. When it is judged that the operating condition information stored beforehand in the operating condition data storage unit 111*a* includes the data which agrees with the operating condition information in the inputted device information 121, the data judgment unit 101 reads, from the internal state data storage unit 111*b*, internal state information corresponding to the operating condition information in the operating condition data storage unit 111*a*, and then outputs the read internal state information and the inputted device information 121 with both of them associated with each other, as judgment result information, to the state diagnostic unit 103.

The state diagnostic unit 103 compares the internal state information included in the inputted device information with the internal state information stored beforehand in the internal state data storage unit 111*b*, and then outputs the result of the comparison. As a result of the comparison, when the internal state information stored beforehand in the internal state data storage unit 111*b* includes data that agrees with the internal state information included in the inputted device information, maintenance information indicating whether the target device is "normal" or "abnormal" is read from the maintenance information data storage unit 111*c*. When the maintenance information indicates that the target device is "normal", the diagnostic result indicating normal state is output to the display unit 204 located outside of the device diagnostic apparatus. When the maintenance information indicates that the target device is "abnormal", the diagnostic result indicating any one of an abnormal component, a detailed description of the abnormal state, and a detailed description of measures taken (or a combination of them) is output to the display unit 204. Moreover, when a rate of change included in the internal state information is recognized, and when the date on which the abnormal state exerts an influence upon an operation situation of the target device can be expected, the date is also output to the display unit 204 together with the above-described information.

Figure 12:
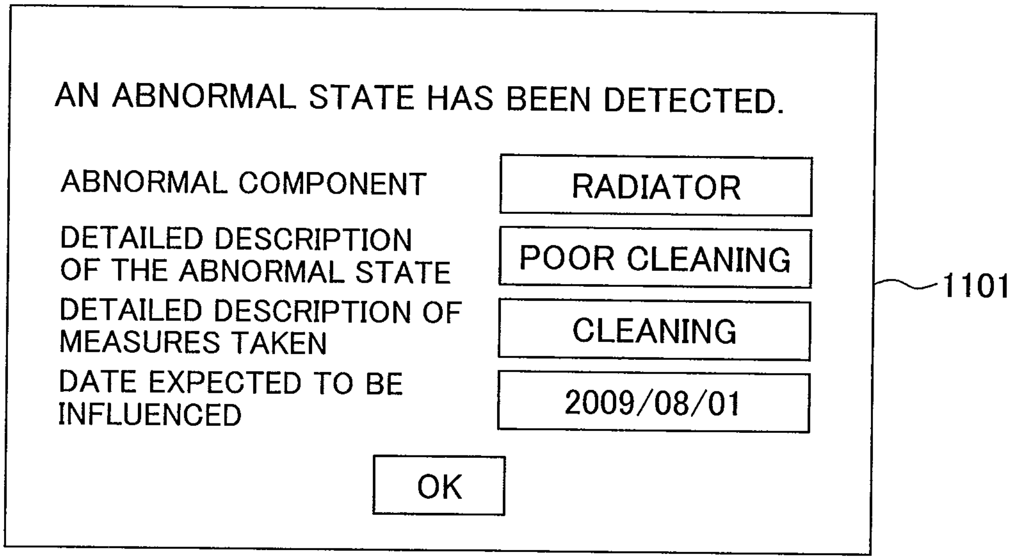
FIG. 12 is a diagram illustrating an example in which information output by the device diagnostic apparatus is displayed according to one embodiment of the present invention.

FIG. 12 illustrates a display screen 1101 that is an example in which the display unit 204 displays the diagnostic result. In this example, the abnormal component, the detailed description of the abnormal state, the detailed description of measures taken, and the date expected to be influenced are displayed on the display screen 1101. Users (including an operator, and an operation manager) who view the display screen 1101 can judge when, which and how part of the target device should be maintained. These pieces of maintenance information are inputted or selected by the diagnostic database update unit 104, and are then stored in the maintenance information data storage unit 111*c* (described later).

On the other hand, as a result of the comparison made by the state diagnostic unit 103 between the internal state information included in the inputted device information and the internal state information stored beforehand in the internal state data storage unit 111*b*, when it is judged that the internal state information stored beforehand in the internal state data storage unit 111*b* does not include the data that agrees with the internal state information included in the inputted device information, diagnostic result indicating that the target device may be abnormal is output to the display unit 204 to perform the preventive maintenance.

The judgment that the internal state information stored beforehand in the internal state data storage unit 111*b* does not include the data that agrees with the internal state information included in the inputted device information has two cases. The one is a case where the internal data storage unit 111*b* includes only the internal state information in which the maintenance information indicates "normal," and the other case is that the internal data storage unit 111*b* includes only the internal state information in which the maintenance information indicates "abnormal." However, when process learning information is added to the diagnostic database 111, and the diagnostic database 111 is updated, the addition or the update is usually made on the basis of the process learning information obtained in the case where the maintenance information indicates "normal." Accordingly, when the internal state information stored beforehand in the internal state data storage unit 111*b* does not include the data that agrees with the inputted internal state information, there is a high possibility that only the internal state information in which the maintenance information indicates "abnormal" may be included. Therefore, in this case, in order to perform the preventive maintenance, the state diagnostic unit 103 outputs the diagnostic result that the target device may be abnormal to the display unit 204.

Figure 5:
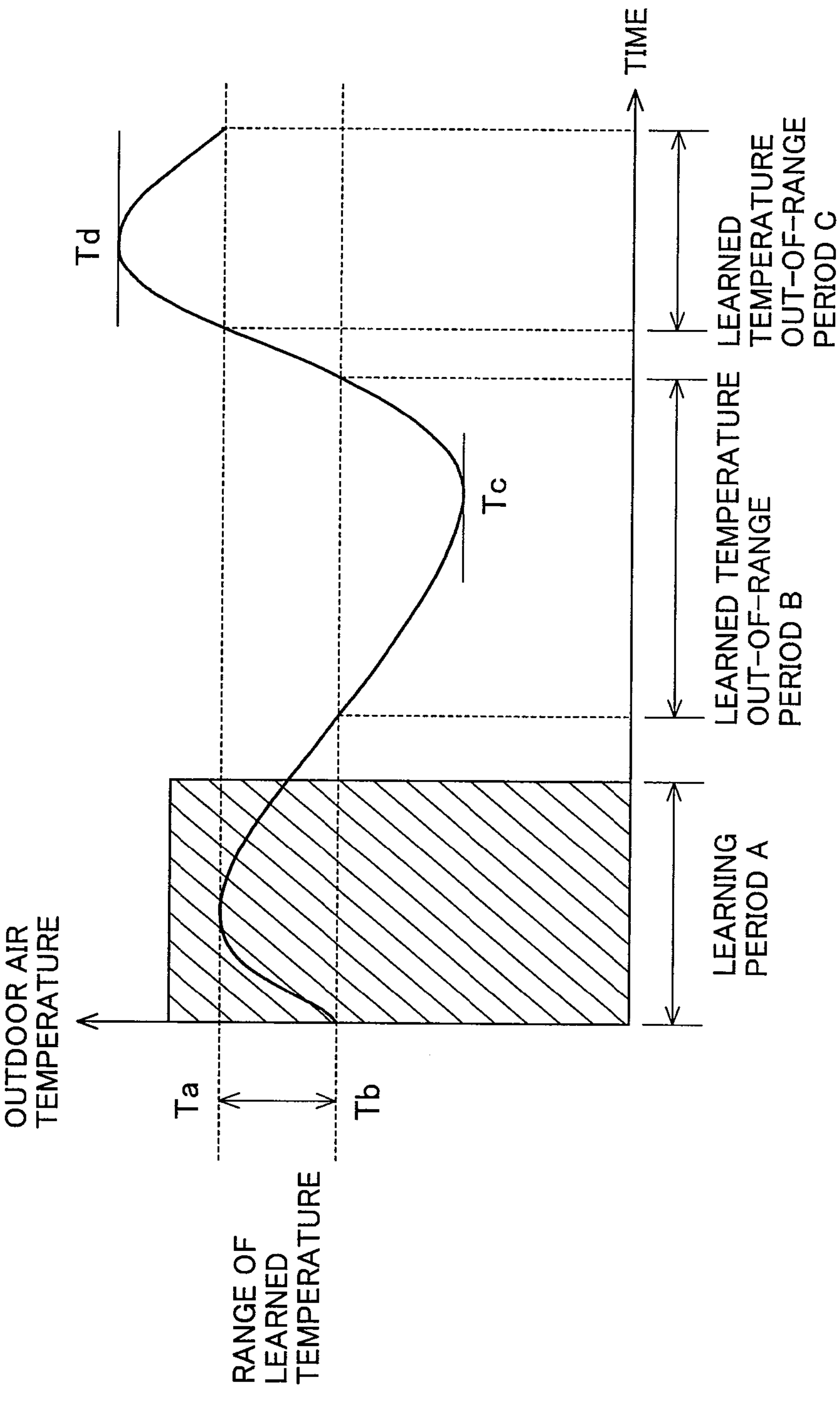
FIG. 5 is a diagram illustrating the relationship between a learning period and a range of learning.

Next, the data judgment unit 101 searches whether the operating condition data storage unit 111*a* includes information that agrees with the operating condition information in the inputted device information 121. To be more specific, the data judgment unit 101 compares the operating condition information in the inputted device information 121 with the operating condition information stored beforehand in the operating condition data storage unit 111*a* to judge whether or not both of them agree with each other. As a result of the judgment, when it is judged that the operating condition information stored beforehand in the operating condition data storage unit 111*a* does not include the data which agrees with that in the inputted device information 121, disagreement information indicating that an operating condition is a factor of the disagreement is output to the process learning unit 102, together with the inputted device information (including both the operating condition information and the internal state information). For example, as shown in FIG. 5, on the assumption that, among pieces of operating condition information that have already been reflected in the diagnostic database 111, the outdoor air temperature data has been learned on the basis of a "learning period A" shown in the figure, learned data of the diagnostic database 111 exists within a temperature range from Ta to Tb shown in the figure. However, in the case where the target device is actually used under such operating conditions as exceeding a learned range, with the passage of time, the temperature range may be extended to that shown in the figure, that is, from Td to Tc. In this case, two learned temperature out-of-range periods B and C become unlearning periods. Usually, in such a case, if diagnosis is carried out by use of the diagnostic database 111 just as it is, although the target device is normal, misjudgment will occur because of a shortage of learning, which is a problem.

Figure 6:
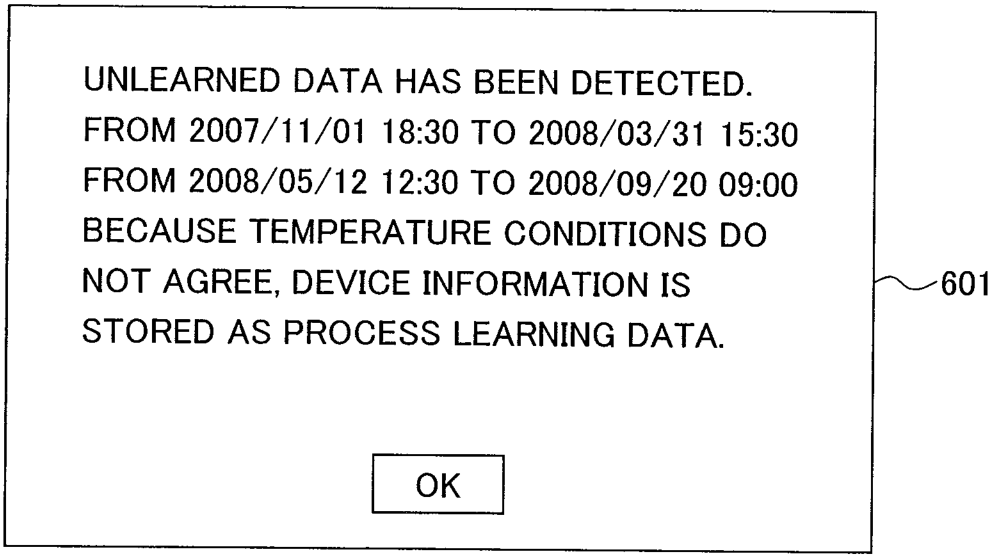
FIG. 6 is a diagram illustrating an example in which information output by the device diagnostic apparatus is displayed according to one embodiment of the present invention.

Therefore, when device information including operating condition information which is not stored in the diagnostic database 111 is inputted to the judgment unit 101 (when the judgment result information output from the data judgment unit 101 indicates disagreement), the process learning unit 102 learns this device information, and then stores the learned device information in the process database 112 as process learning information. FIG. 6 is a diagram illustrating a notification screen 601 for notifying a user (not illustrated) of the system shown in FIG. 17 that the learned device information is stored in the process database 112. When inputted device information including operating condition information which is not stored in the diagnostic database 111 is inputted to the data judgment unit 101 (in other words, if unlearned data has been inputted), the process learning unit 102 instructs the display unit 204 to display a message stating that unlearned data has been detected, and also to display a message stating that the unlearned data is stored as process learning information, as well as the date and time at which the unlearned data is stored. In the example shown in FIG. 6, two periods which correspond to the learned temperature out-of-range periods B and C shown in FIG. 5 respectively are displayed as follows:

B: from 2007/11/01 18:30 to 2008/03/31 15:30

C: from 2008/05/12 12:30 to 2008/09/20 09:00

Figure 2:
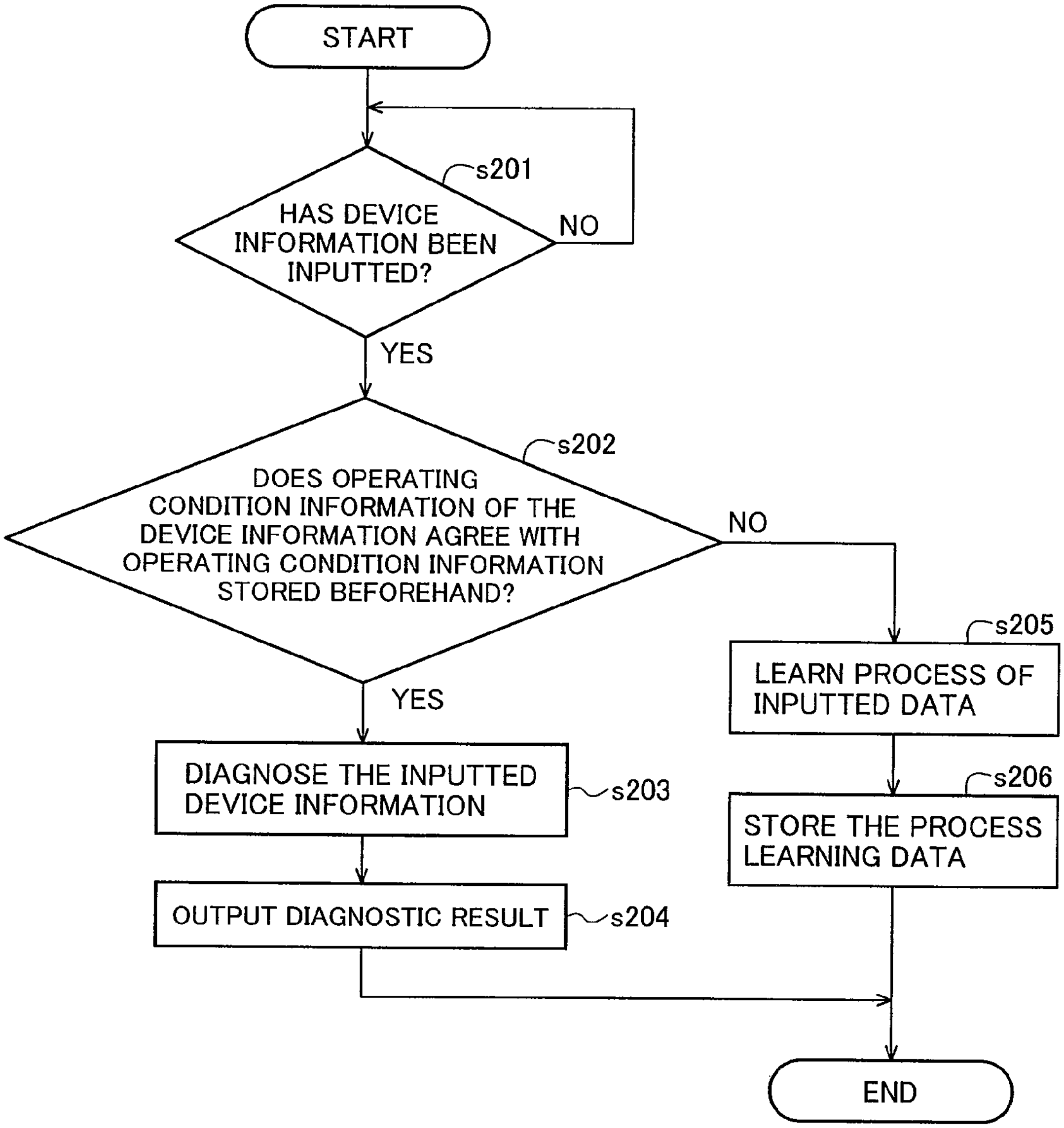
FIG. 2 is a flowchart illustrating how a data judgment unit and a state diagnostic unit, which are included in a device diagnostic apparatus, operate according to one embodiment of the present invention.

The above process flow will be described with reference to a flowchart shown in FIG. 2. First of all, the data judgment unit 101 judges whether or not the device information 121 has been inputted (S201). When it is judged that the device information 121 has been inputted, the data judgment unit 101 refers to information stored in the operating condition data storage unit 111*a* to judge whether or not the information stored in the operating condition data storage unit 111*a* includes data that agrees with operating condition information in the device information 121 (S202). When the data which agrees with the operating condition information in the device information 121 is detected, the data judgment unit 101 outputs the inputted device information 121 to the state diagnostic unit 103. The state diagnostic unit 103 makes a diagnosis of the device information 121 with reference to the diagnostic database 111 (S203), and then outputs the diagnostic result to an outside display unit, or the like (S204). When the data which agrees with the operating condition information in the device information 121 is not detected in the operating condition data storage unit 111*a*, the data judgment unit 101 outputs the device information 121 to the process learning unit 102. The process learning unit 102 learns the device information 121 (S205), and then stores the learned device information in the process database 112 as process learning information (S206).

Figure 7:
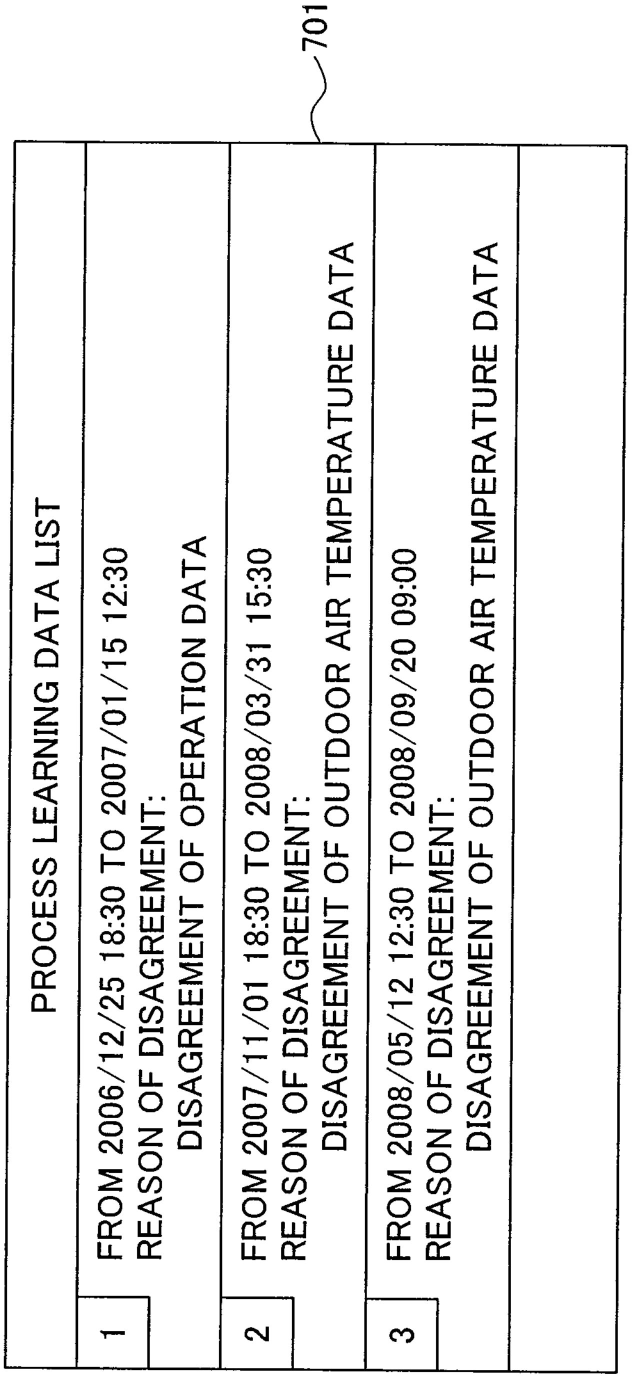
FIG. 7 is a diagram illustrating an example in which information output by the device diagnostic apparatus is displayed according to one embodiment of the present invention.
Figure 17:
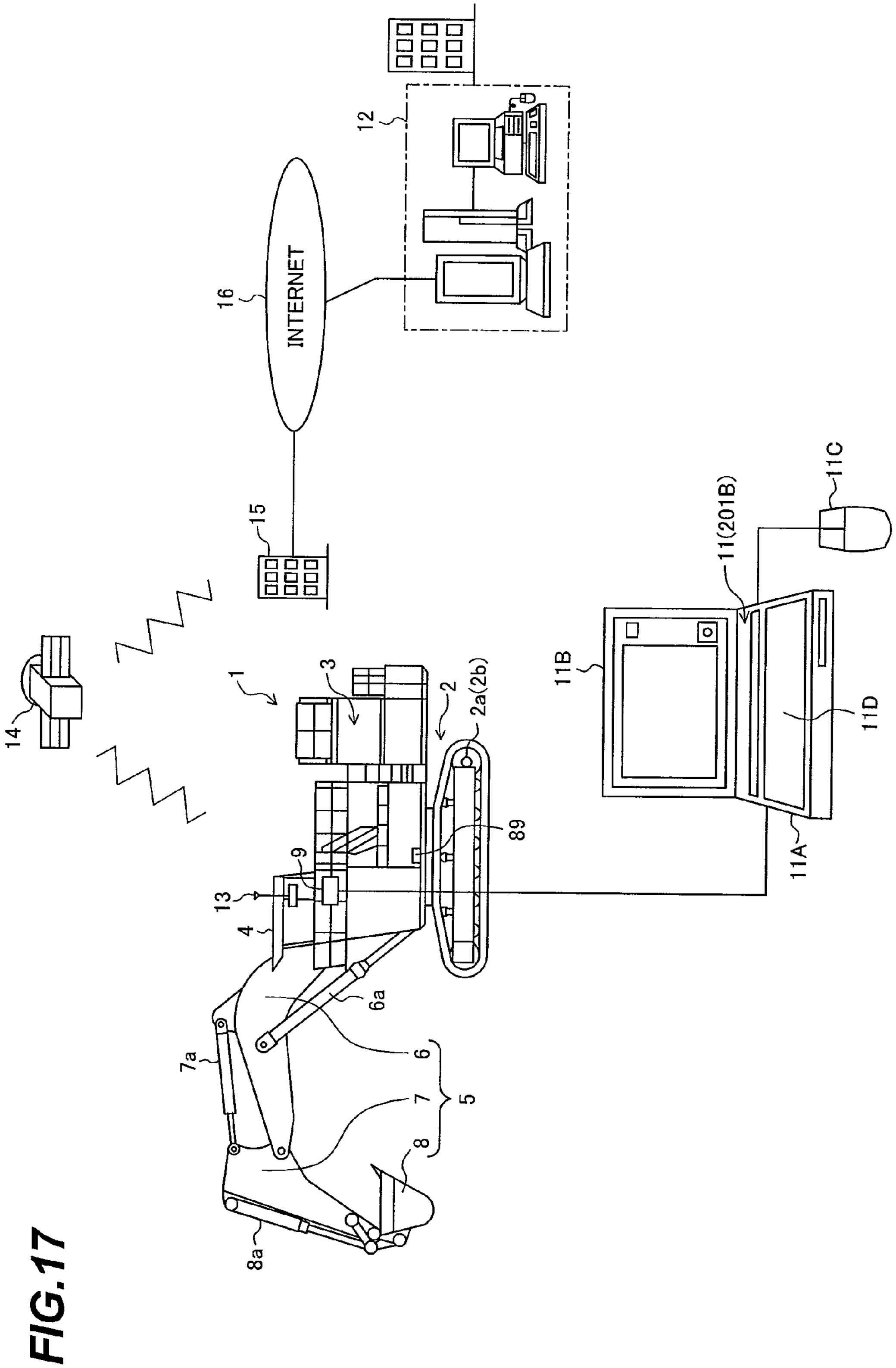
FIG. 17 is a diagram illustrating the structure of a large-size hydraulic excavator as a whole, and a device diagnostic system, according to still another embodiment of the present invention.

The user (not illustrated) of the system shown in FIG. 17 use the input unit 202 and a process learning display request screen (not illustrated) on the display unit 204 to read process learning information from the process database 112, and then a process learning information list screen 701 as shown in FIG. 7 can be displayed on the display unit 204. It is to be noted that the process database 112 stores the process learning information and date data of the date on which the process learning information has been learned, with both of them associated with each other. Accordingly, the display unit can display the process learning information and the date data of the date on which the process learning information has been learned, in an associated manner with each other. In the example illustrated in the figure, disagreement information which is process learning information output from the process learning unit 102 is displayed as follows: a disagreement period is displayed on the upper side of each field of the list screen 701; and a reason of the disagreement such as "disagreement of operation data", and "disagreement of outdoor air temperature data" is displayed on the lower side of each field of the list screen 701. In addition, disagreement information displayed in fields 2 and 3 correspond to the learned temperature out-of-range periods B and C respectively.

Figure 8:
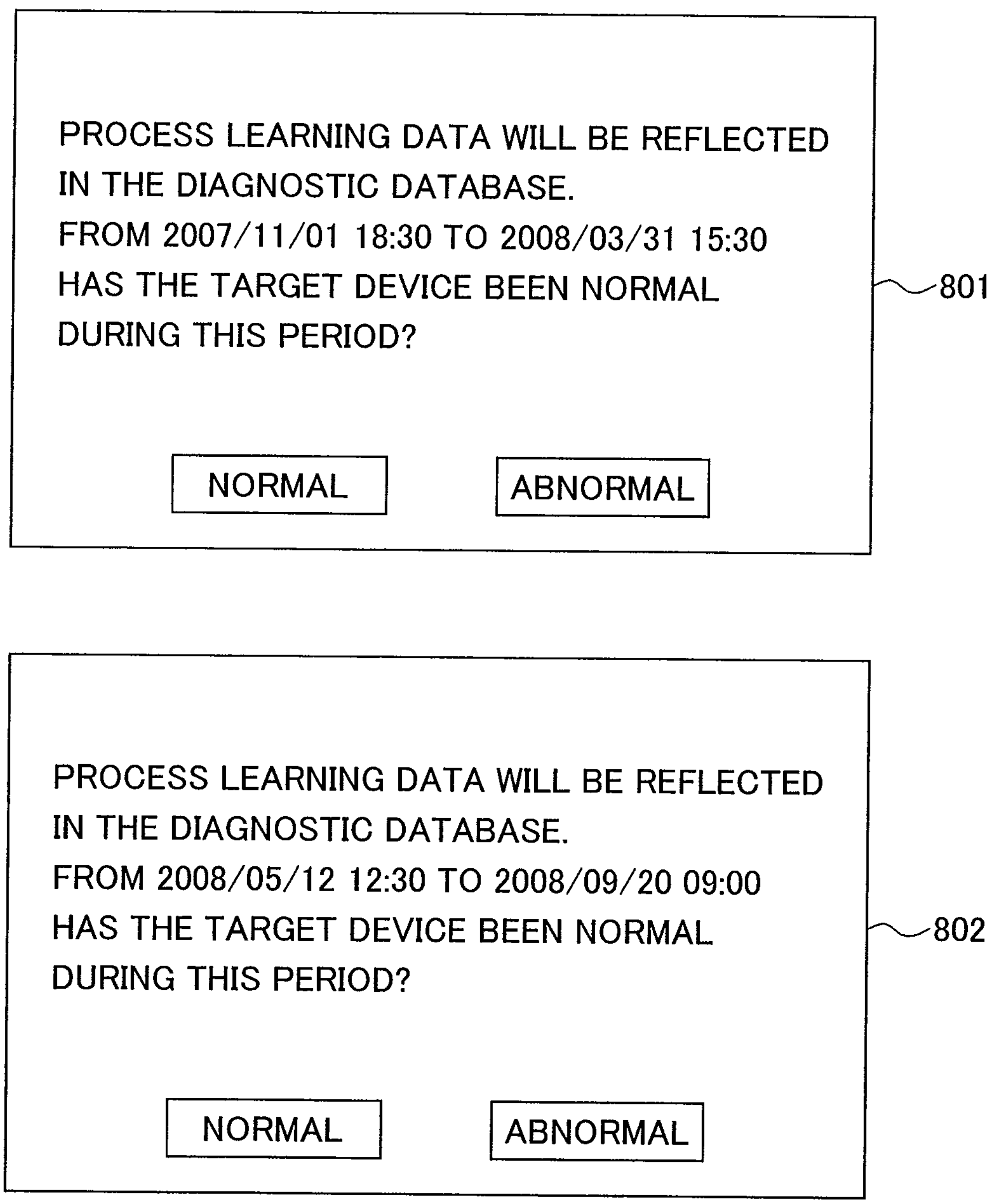
FIG. 8 is a diagram illustrating an example in which information output by the device diagnostic apparatus is displayed according to one embodiment of the present invention.

The diagnostic database update unit 104 detects whether or not the process database 112 has been updated. When it is detected that the process database 112 has been updated, the diagnostic database update unit 104 outputs process database update request information. The process database update request information is displayed on the display unit 204 as diagnostic database update request screens 801 and 802. As shown in FIG. 8, each of the diagnostic database update request screens 801 and 802 displays, for example, a comment of "the process learning information will be reflected in the diagnostic database", and a target period of data, and a request which prompts the user to input or select whether or not the target device has been normal during the period. The diagnostic database update request screen 801 corresponds to the learned temperature out-of-range period B, whereas the diagnostic database update request screen 802 corresponds to the learned temperature out-of-range period C.

The user (not illustrated) of the system shown in FIG. 17 checks a device state for the period during which the data is targeted, and then notifies the diagnostic database update unit 104 of an abnormal state judgment result indicating that the target device has been normal or abnormal during the target period. The notification of the abnormal state judgment is performed by clicking or selecting a "Normal" button or an "Abnormal" button displayed on the diagnostic database update request screens 801 and 802, or by inputting the abnormal state judgment result. Here, the abnormal state judgment result is inputted through the diagnostic database update request screens 801 and 802 by use of the input unit 202. The input unit 202 is a keyboard, or a mouse, used by the user (not illustrated) of the system shown in FIG. 17. The diagnostic database update request screens 801 and 802 and the input unit 202 constitute maintenance information input means.

Figure 9:
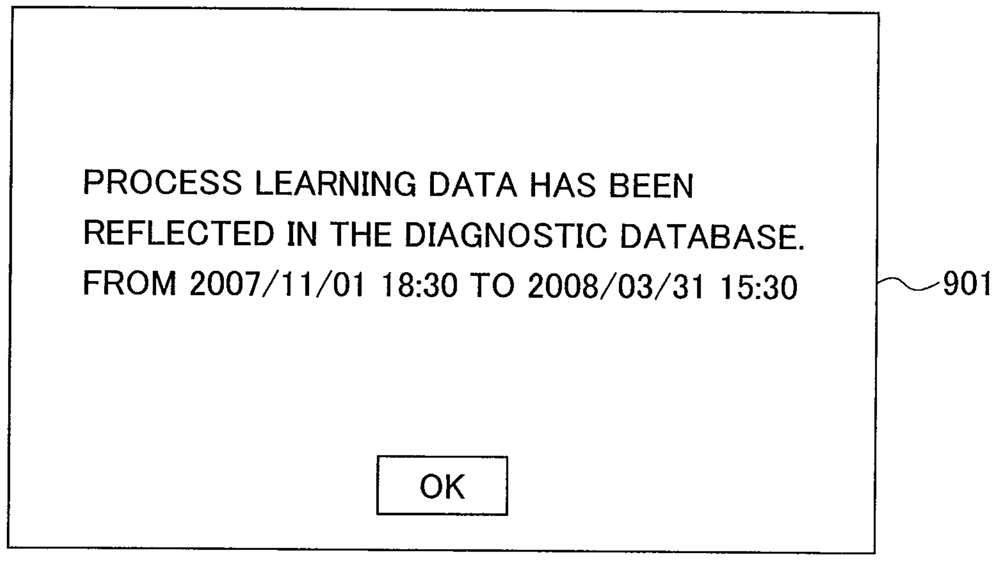
FIG. 9 is a diagram illustrating an example in which information output by the device diagnostic apparatus is displayed according to one embodiment of the present invention.

When the user (not illustrated) of the system shown in FIG. 17 selects "normal" as the abnormal state judgment result (more specifically, when the user inputs maintenance information indicating "normal" through the diagnostic database update request screen 801 by use of the input unit 202), the diagnostic database update unit 104 adds process learning information (corresponding to the device information) together with the abnormal state judgment result "normal" to the information stored in the maintenance information data storage unit 111*c* of the diagnostic database 111 as diagnostic information and updates the data thereof. FIG. 9 is a diagram illustrating an example of a notification screen of the display unit 204, the notification screen being used to notify the user of update of the diagnostic database when the diagnostic database has been updated. This notification screen is displayed when the target device has been normal during the learned temperature out-of-range period B displayed in the diagnostic database update request screen 801 of FIG. 8. The notification screen 901 shown in FIG. 9 displays a message stating that the process learning information has been reflected in the diagnostic database by the diagnostic database update unit 104, as well as the date and time on which the process learning information has been reflected.

Figure 10:
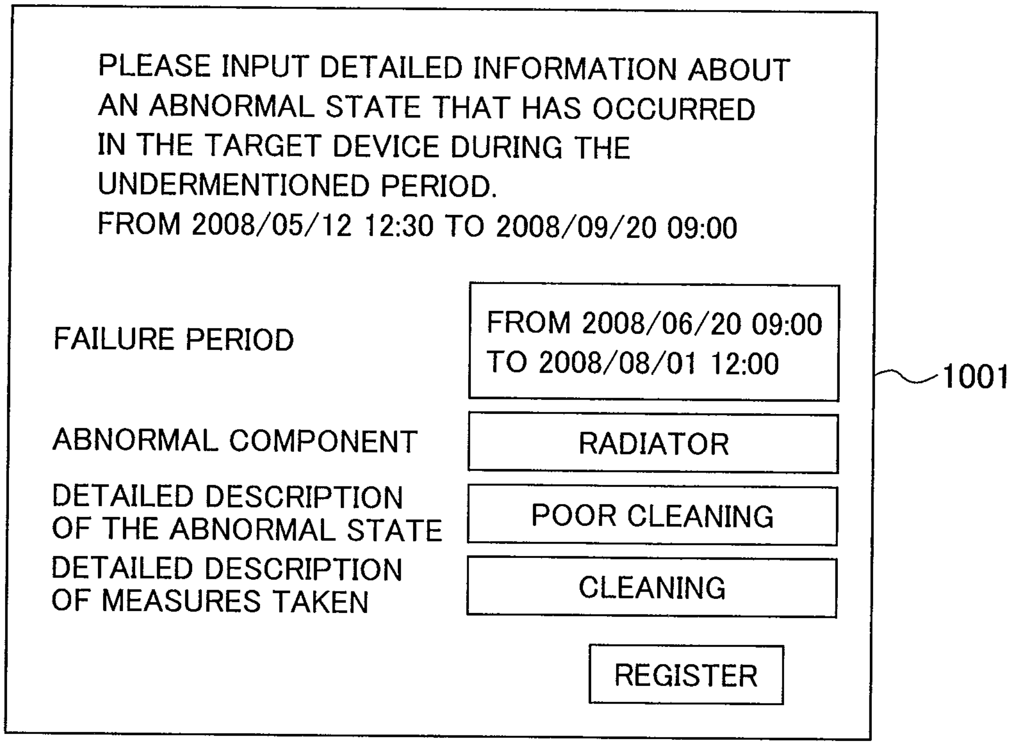
FIG. 10 is a diagram illustrating an example in which information output by the device diagnostic apparatus is displayed according to one embodiment of the present invention.

When the user (not illustrated) of the system shown in FIG. 17 selects "abnormal" as the abnormal judgment result (more specifically, when the user inputs maintenance information indicating "abnormal" through the diagnostic database update request screen 802 by use of the input unit 202), the diagnostic database update unit 104 instructs the display unit 204 to display a maintenance information input screen 1001 that requests the user to input data such as a failure period, an abnormal component, a detailed description of the abnormal state, and a detailed description of measures taken, into fields as shown in FIG. 10. The maintenance information input screen 1001 is displayed when a failure has occurred in the target device during the learned temperature out-of-range period C which is displayed on the diagnostic database update request screen 802 in FIG. 8. In this case, "from 2008/06/20 09:00 to 2008/08/01 12:00", "radiator", "poor cleaning", and "cleaning" are inputted into the fields of the failure period, the abnormal component, the detailed description of the abnormal state, and the detailed description of measures taken respectively.

Figure 11:
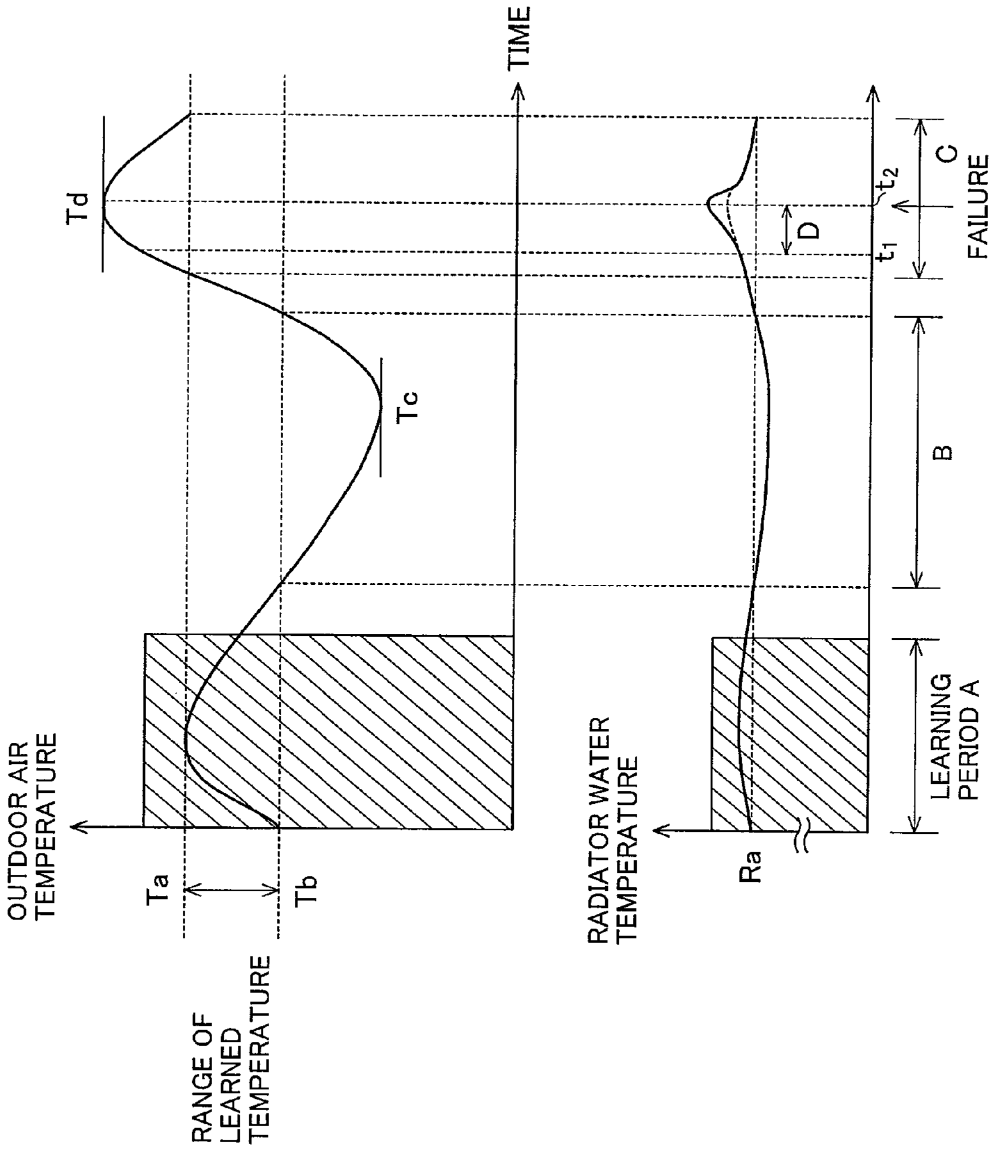
FIG. 11 is a diagram illustrating an example of the relationship between operating condition information (the outdoor air temperature) and internal state information (the radiator water temperature)

FIG. 11 is a graph illustrating an example of the relationship between the outdoor air temperature and the water temperature of a radiator in a case where operating condition information is the outdoor air temperature, and internal state information is the radiator water temperature. When the outdoor air temperature changes as shown in FIG. 5, the radiator water temperature also analogously changes under the influence of the outdoor air temperature. The learned temperature out-of-range period B is a period during which the target device is kept normal. In contrast, the learned temperature out-of-range period C is a period including the failure time at which a failure has occurred in the target device. In the learned temperature out-of-range period B, the ratio of the change in the radiator water temperature relative to the outdoor air temperature is substantially the same as that in water temperature Ra relative to the outdoor temperature in the learning period A. In a region D ranging from the time t1 to the time t2, the period D being included in the learned temperature out-of-range period C, the ratio of the change in the radiator water temperature relative to the outdoor air temperature is more steeply in comparison with that in the other periods. The highest radiator water temperature is shown at the time t2. A cause of the steep change in radiator water temperature in the period D is, for example, adhesion of a large amount of dust to a radiation fin of the radiator. Accordingly, cleaning of the radiator by a maintenance person at the time t2 makes it possible to return the steep change in radiator water temperature to a normal change thereafter.

The working machine is equipped with a data recording device for recording device information 121 (described later). The user of the system shown in FIG. 17 can know the change in radiator water temperature in the past by displaying data of the radiator water temperature recorded in the data recording device on the display unit. On the basis of the radiator water temperature data, the user of the system shown in FIG. 17 inputs the period D (a specified period that starts from a point of time before the time t2 at which the abnormal change in radiator water temperature becomes the largest, and that includes the time t2) into the field of the failure period shown in FIG. 10.

On the completion of the input of the data into the maintenance information input screen 1001 by the user using the input unit 202, the diagnostic database update unit 104 adds, as diagnostic information, the input data and the abnormal state judgment result "abnormal" to the information stored in the maintenance information data storage unit 111*c* of the diagnostic database 111 and updates the data thereof. At the same time, process learning information (operating condition information (for example, the outdoor air temperature) and internal state information (for example, the radiator water temperature) at this point of time) are stored in the operating condition data storage unit 111*a* and the internal state data storage unit 111*b* with the maintenance information in question associated with. In this case, the abnormal state judgment result "abnormal" is added to the maintenance information corresponding to the internal state information (the water temperature of the radiator) in the period D. Thus, diagnosis for the preventive maintenance of the target device (radiator) and associated devices thereof can be performed since the maintenance information corresponding to the internal state information (the radiator water temperature) in the period D indicates "abnormal". The period D starts not from the time at which the failure has occurred but from the time t1 at which the water temperature of the radiator has steeply changed. To be more specific, after the learned temperature out-of-range period B, the outdoor air temperature and the radiator water temperature change as shown in the period C shown in FIG. 11, and when the internal state information included in the inputted device information to be compared in the state diagnostic unit 103 agrees with the internal state information included in the internal state data storage unit 111*b*, maintenance information indicates "abnormal" which is started from a point of time immediately after the start of the period D. The diagnostic result is then output to the display unit 204. As a result, an abnormal state can be diagnosed before a failure occurs. This enables maintenance work for the preventive maintenance.

Figure 3:
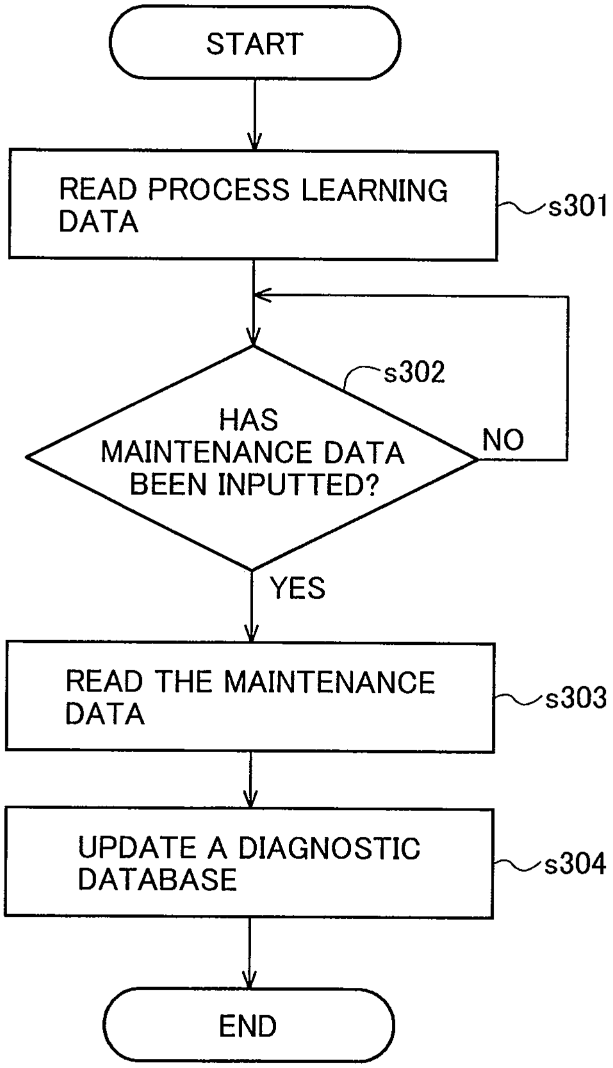
FIG. 3 is a flowchart illustrating the operation of a diagnostic database update unit of the device diagnostic apparatus according to one embodiment of the present invention.

The above process flow will be described with reference to a flowchart shown in FIG. 3.

First of all, the diagnostic database update unit 104 reads process learning information from the process database 112 (S301). A judgment is made as to whether or not a user (not illustrated) has inputted maintenance information through the maintenance information input screen 1001 (S302). As a result of the judgment, when it is judged that the maintenance information has been inputted, the diagnostic database update unit 104 reads the maintenance information, and then adds the maintenance information to the read process learning information. Next, the diagnostic database update unit 104 adds the read process learning information and the maintenance information, as diagnostic information, to the information stored in the maintenance information data storage unit 111*c* of the diagnostic database 111 and updates the data thereof. At the same time, the diagnostic database update unit 104 stores the process learning information (the operating condition information and the internal state information at this point of time) in the operating condition data storage unit 111*a* and the internal state data storage unit 111*b* (S304).

As described above, the device information is divided into the operating condition information and the internal state information and they are separately recorded, and the maintenance information is added to the operation condition information and the internal state information. This makes it possible to increase the judgment accuracy of the diagnostic apparatus.

Second Embodiment

Another embodiment different from the first embodiment will be described below with reference to FIGS. 13 through 16 with a focus placed on points which is different from the first embodiment.

Figure 13:
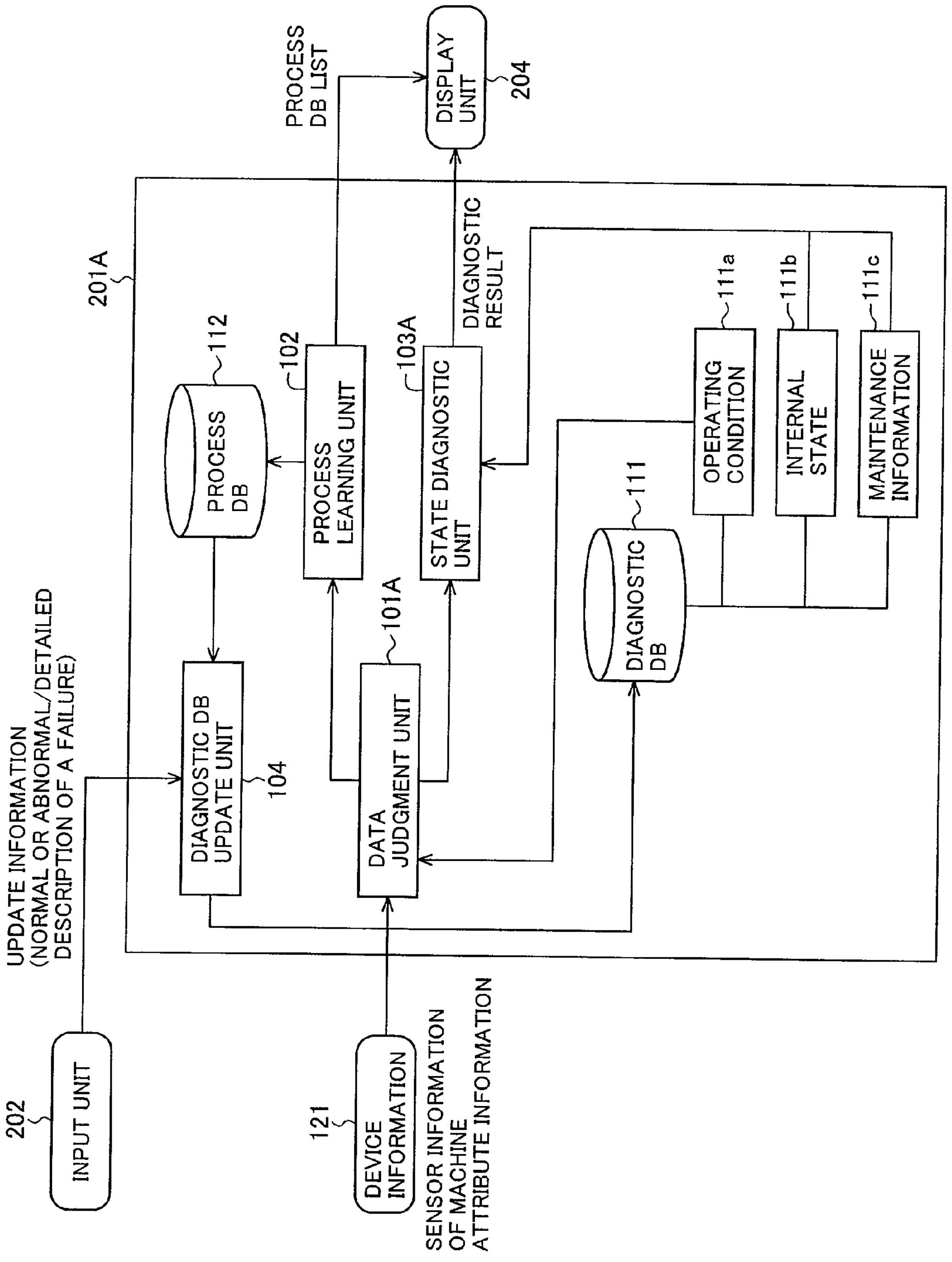
FIG. 13 is a diagram illustrating a device diagnostic system according to another embodiment of the present invention.
Figure 14:
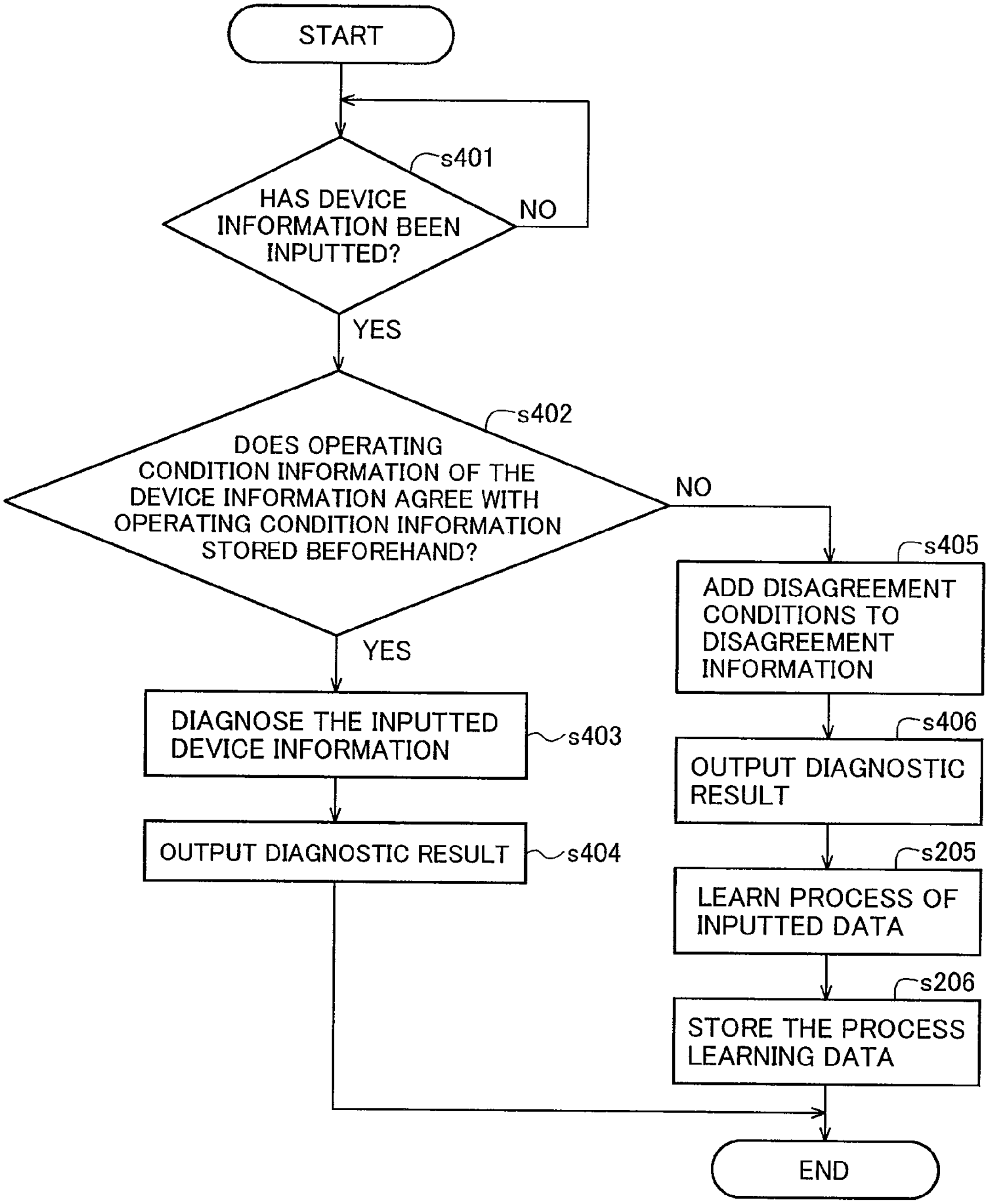
FIG. 14 is a flowchart illustrating how a data judgment unit and a state diagnostic unit, which are included in a device diagnostic apparatus, operate according to another embodiment of the present invention.

FIG. 13 is a diagram illustrating a configuration of a device diagnostic system according to this embodiment. FIG. 14 is a diagram illustrating the process flow of data judgment means of the device diagnostic apparatus.

First of all, referring to FIG. 13, the data judgment unit 101A and the state diagnostic unit 103A, both of which are included in the device diagnostic apparatus 201A of the device diagnostic system according to this embodiment, differ in function from those shown in FIG. 1.

To be more specific, referring to FIG. 14, the data judgment unit 101A judges whether or not the device information 121 (the operating condition information and the internal state information) has been inputted (S401). When it is judged that the device information 121 has been inputted, the data judgment unit 101A compares the operating condition information in the inputted device information 121 with the operating condition information stored beforehand in the operating condition data storage unit 111*a* to judge whether or not the operating condition information stored beforehand includes data that agrees with the operating condition information in the inputted device information 121 (S402). When the data which agrees with the operating condition information in the inputted device information 121 is detected, as is the case with the process flow shown in FIG. 2, the data judgment unit 101A outputs the inputted device information 121 to the state diagnostic unit 103A. The state diagnostic unit 103A makes a diagnosis of the device information 121 with reference to the diagnostic database 111 (S403), and then outputs the diagnostic result to an outside display unit (S404). When the data which agrees with the operating condition information in the inputted device information 121 is not detected in the operating condition data storage unit 111*a*, as well as an abnormal component, a detailed description of an abnormal state, and the date expected to be influenced, "detailed description of conditions" which indicates that a judgment has been conditionally made is added to disagreement information (S405). The disagreement information to which the detailed description of conditions has been added is output as the diagnostic result (S404). After that, as is the case with the embodiment shown in FIG. 2, process learning processing S205 and diagnostic database update processing S206 are performed. Incidentally, the process learning processing S205 and the diagnostic database update processing S206 may also be performed before the processing S404.

Figure 15:
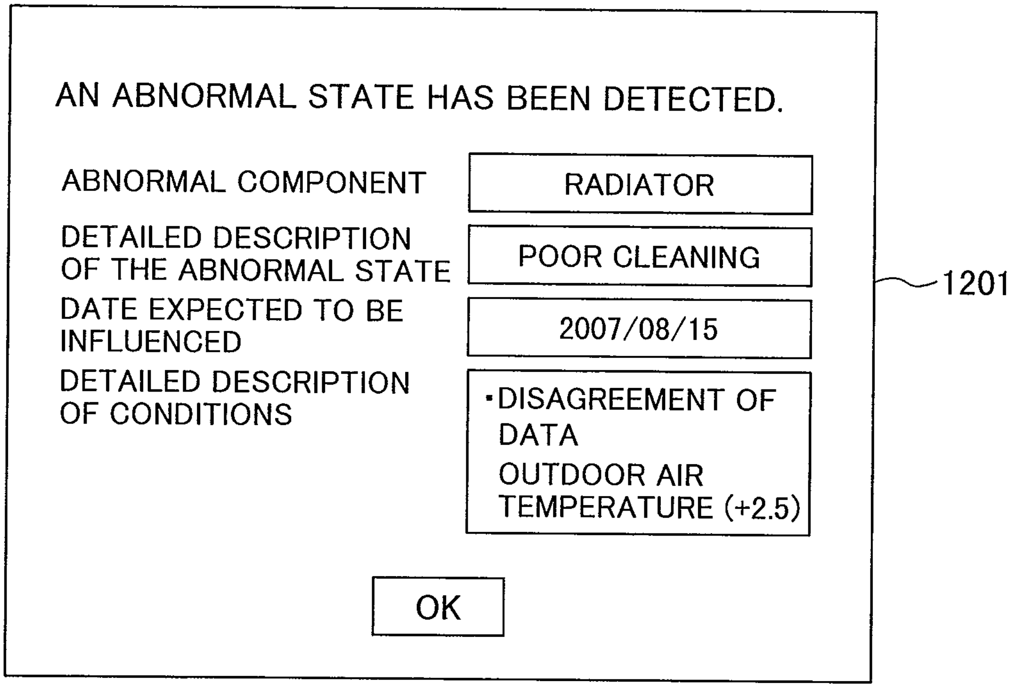
FIG. 15 is a diagram illustrating an example in which information output by the device diagnostic apparatus is displayed according to another embodiment of the present invention.

FIG. 15 is a diagram illustrating an example of a screen on which the display unit displays the diagnostic result of this disagreement information. An abnormal component, a detailed description of an abnormal state, and the date expected to be influenced are displayed on the screen. In addition to them, disagreement information indicating that a judgment has been conditionally made is displayed in a "detailed description of conditions" field on the screen. This example shows a case where outdoor air temperature data included in the operating condition information disagrees with data stored beforehand in the operating condition database. In this case, data disagreement, the outdoor air temperature (a data name of the disagreement), and the difference indicating a degree of the data disagreement ("+2.5") are displayed in the "detailed description of conditions" field.

Figure 16:
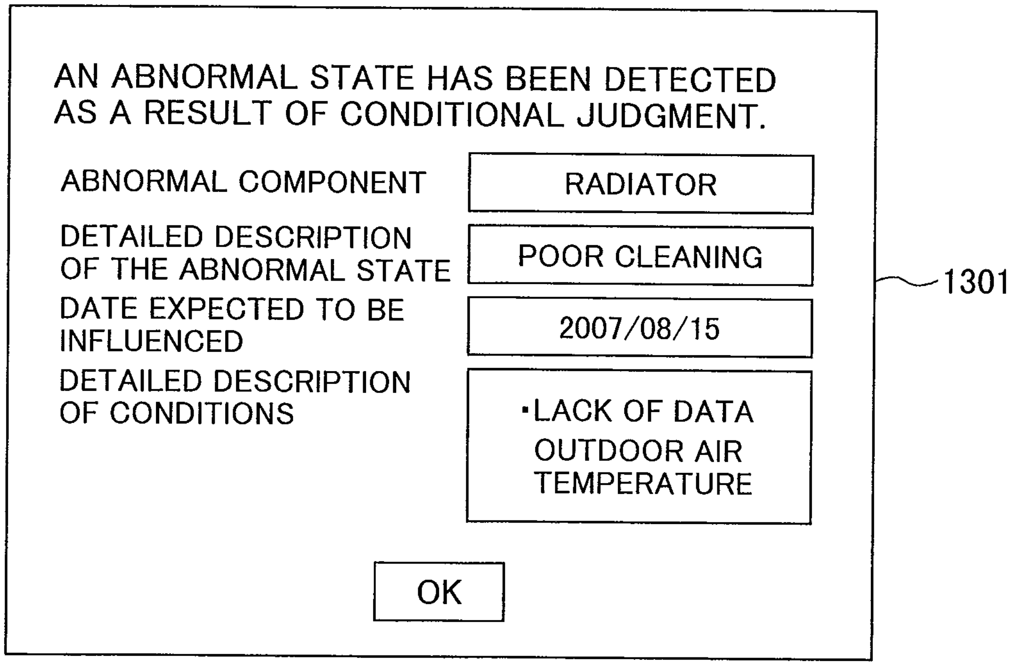
FIG. 16 is a diagram illustrating an example in which information output by the device diagnostic apparatus is displayed according to another embodiment of the present invention.

As another example, when it is judged in the processing S401 that a plurality of pieces of device information 121 have been inputted, information stored in the operating condition data storage unit 111*a* is referred to for each piece of device information so as to judge in processing S402 whether or not the information stored in the operating condition data storage unit 111*a* includes operating condition information that agrees with operating condition information in the plurality of pieces of device information 121. When at least one piece of operating condition information among the pieces of operating condition information in the plurality of pieces of device information is not stored in the operating condition data storage unit 111*a* and therefore, comparison can not be made, the piece of operating condition information in question is judged to be disagreement. In this case, in processing S405, as is the case with the above processing, as well as the abnormal component, the detailed description of an abnormal state, and the date expected to be influenced, "detailed description of conditions" field indicating that a judgment has been conditionally made is added to the disagreement information. The disagreement information to which the detailed description of conditions has been added is output as the diagnostic result (S404). The abnormal component, the detailed description of the abnormal state, the date expected to be influenced, and the detailed description of conditions, which have been output, are displayed on the display unit. In this case, as shown in FIG. 16, not the fact of disagreement, but a lack of data and a data name of the incomplete data are displayed in the "detailed description of conditions" field on the display unit. To be more specific, FIG. 16 shows that the display unit shows a user (not illustrated) that, among the pieces of operating condition information, outdoor air temperature data is not stored.

Incidentally, in the example described above, four kinds of information (the abnormal component, the detailed description of the abnormal state, the date expected to be influenced, and the detailed description of conditions) are created and displayed as the disagreement information. However, it is not necessary to create and display all of them. The disagreement information may also be created and displayed by adding the detailed description of conditions to any one of the abnormal component, the detailed description of the abnormal state, and the date expected to be influenced. For example, the detailed description of conditions may be added to the detailed description of the abnormal state so as to create and display the disagreement information.

As described above, even if unlearned device data is inputted, a temporary diagnostic result can be presented to the user by outputting the diagnostic result to which the disagreement information of the operating condition information is added.

Third Embodiment

An embodiment in which the present invention is applied to the diagnosis of devices included in a large-size hydraulic excavator will be described with reference to FIGS. 17 through 22.

FIG. 17 is a diagram illustrating the structure of a large-size hydraulic excavator as a whole and a device diagnostic system.

In FIG. 17, a hydraulic excavator 1 is a supersized shovel (backhoe type shovel) having a weight of several hundred tons. Supersized shovels are often used in, for example, overseas mines. This hydraulic excavator 1 includes: a track body 2; a swing body (body) 3 that is swingably provided on the track body 2; a cabin 4 that is located on the front left side of the swing body 3; and a front work device 5 that is elevatably provided at the front center of the swing body 3. The front work device 5 is constituted of: a boom 6 that is pivotably mounted to the swing body 3; an arm 7 that is pivotably mounted to the tip of the boom 6; and a bucket 8 that is pivotably mounted to the tip of the arm 7. For example, the swing body 3 is equipped with two engines, and a plurality of main pumps (described later) driven by these engines. Right and left travelling motors 2*a*, 2*b* drive right and left crawler belts respectively, which causes the track body 2 to move forward or backward. The swing body 3 is driven by an unillustrated swing-motion motor so that the swing body 3 swings with respect to the track body 2. The boom 6, the arm 7, and the bucket 8 are driven by a boom cylinder 6*a*, an arm cylinder 7*a*, and a bucket cylinder 8*a* respectively. A data recording device 9 is disposed in the cabin 4. Detection signals from various kinds of sensors (detection means) are inputted into the data recording device 9 at specified time intervals, and these pieces of information are stored as device information 121A. A personal computer 11 equipped with a device diagnostic apparatus 201B can be connected to the data recording device 9 through a cable. The device information 121A stored in the data recording device 9 can be downloaded into the personal computer 11 by connecting the personal computer 11 to the data recording device 9. The personal computer 11 includes: a personal computer main body 11A; a display unit 11B used as display means; and a mouse 11C and a keyboard 11D that are used as input means.

In addition, the device diagnostic apparatus 201B may also be provided in a server 12 that is disposed in an administration office of the hydraulic excavator 1 (for example, an office of a manufacturer, a distributor's office, a dealer's office, a rental shop's office, of the hydraulic excavator 1, or the like). In this case, the data recording device 9 includes a radio equipment 13. The device information 121A recorded in the data recording device 9 is periodically transmitted to the server 12 through the radio equipment 13, a communication satellite 14, a base station 15, and Internet 16. If the location of the administration office is relatively near to a work site, after a serviceman connects a portable recording medium such as a memory card to the data recording device 9 to download the device information 121A, the recording medium may be taken back to the administration office and the device information 121A may be downloaded from the recording medium into the server.

Figure 18:
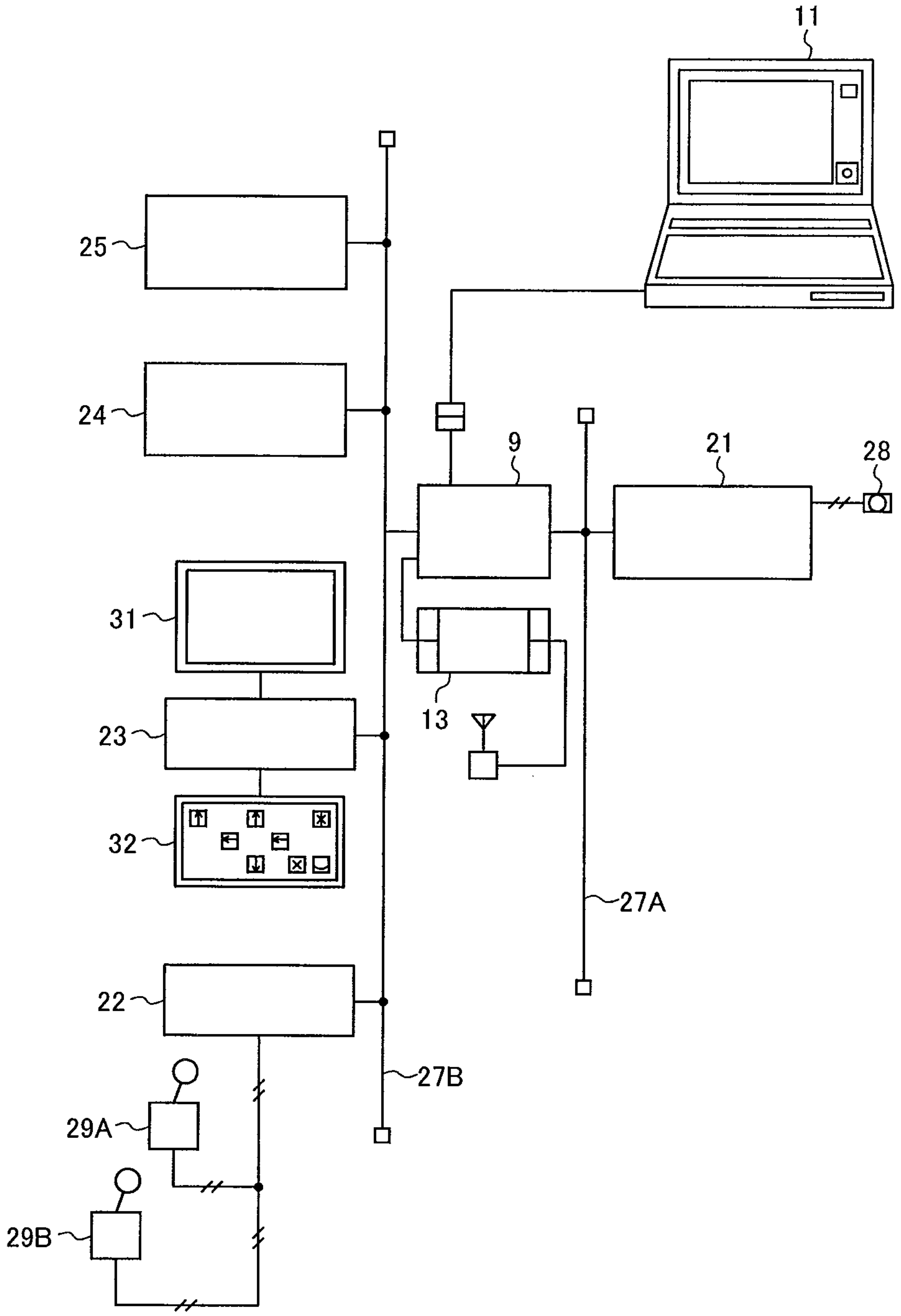
FIG. 18 is a diagram illustrating a controller network disposed in a cabin of a hydraulic excavator.

FIG. 18 is a diagram illustrating a controller network that is disposed in the cabin 4 of the hydraulic excavator 1. The controller network of the hydraulic excavator 1 includes an engine controller 21, a vehicle body controller 22, a monitor controller 23, a hydraulic system measurement unit 24, an engine measurement unit 25, and the data recording device 9 described above. The engine controller 21 is connected to a first common communication line 27A. The vehicle body controller 22, the monitor controller 23, the hydraulic system measurement unit 24, and the engine measurement unit 25 are connected to the second common communication line 27B. The data recording device 9 is connected to both the first and second common communication lines 27A and 27B.

The engine controller 21 controls the fuel injection quantity of an engine by controlling an electronic governor 28. The vehicle body controller 22 receives operation signals (electric signals) of electric lever units 29A, 29B and then controls a solenoid valve (not illustrated) on the basis of the operation signals so as to control a hydraulic system. The monitor controller 23 is connected to both a display unit 31 and an operation unit 32 and carries out the control associated with displaying by the display unit 31 on the basis of the input operation through the operation unit 32. The hydraulic system measurement unit 24 receives and collects detection signals of various kinds of the state quantity associated with a hydraulic system including a pump mission unit. The engine measurement unit 25 receives and collects detection signals of various kinds of the state quantity associated with an engine system including a radiator.

The data recording device 9 receives required data at specified intervals through the first and second common communication lines 27A, 27B, and then stores the data therein as the device information 121A. The required data is selected from among pieces of: state quantity data collected by the hydraulic system measurement unit 24 and the engine measurement unit 25; and input and output data handled by the engine controller 21, the vehicle body controller 22, and the monitor controller 23. As described above, the personal computer 11 (device diagnostic apparatus 201B) can be connected to the data recording device 9. Accordingly, the device information 121A stored in the data recording device 9 can be downloaded into the personal computer 11. In addition, the device information 121A stored in the data recording device 9 is periodically transmitted to the server 12 (device diagnostic apparatus) disposed in the administration office through the radio equipment 13. Moreover, the monitor controller 23 can also be configured to play a role of a device diagnostic apparatus. In this case, the device information 121A stored in the data recording device 9 is periodically transmitted to the monitor controller 23 through the second common communication line 27B.

Figure 19:
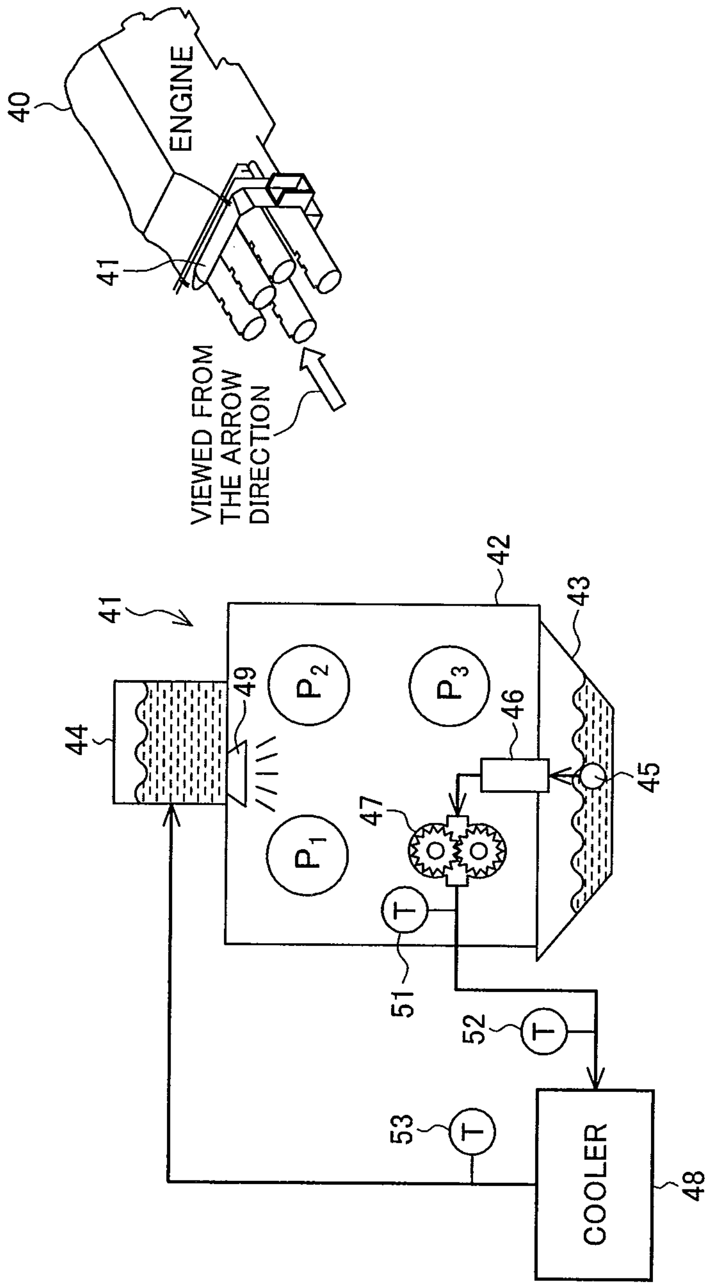
FIG. 19 is a diagram illustrating a pump mission unit that is one of components included in a hydraulic excavator.

FIG. 19 is a diagram illustrating a pump mission unit that is one of components included in the hydraulic excavator 1.

The supersized hydraulic excavator 1 is required to distribute the motive power of one engine 40 into a plurality of main pumps (for example, four main pumps) through a gear mechanism (not illustrated) so that the plurality of main pumps (for example, four main pumps) are driven by the one engine 40. A pump mission unit 41 is provided as means for achieving the requirement. In the figure, P1, P2, P3 schematically illustrate end faces of the pumps respectively. In order to avoid the complexity of illustration, an end face of the remaining one pump and the gear mechanism will not be illustrated. The pressurized oil discharged from the plurality of main pumps including the pumps P1, P2, P3 are supplied to a plurality of actuators such as a boom cylinder 6*a*, an arm cylinder 7*a*, a bucket cylinder 8, and a swing-motion motor.

The pump mission unit 41 includes: a container 42 into which a gear mechanism (not illustrated) is built; an oil pan 43 that is provided on the bottom of the container 42; an upper oil accumulator 44 provided on the top of the container 42; a suction unit 45; an oil filter 46; a gear pump 47; and a mission oil cooler 48. A shape of the oil pan 43 differs depending on a model of machine. The shape of the bottom surface of the oil pan includes a mortar shape (more specifically, the bottom surface of the oil pan extrudes downward), and a flat shape (more specifically, the bottom surface is flat on the whole). The oil pan 43 illustrated in FIG. 19 is an example of the oil pan having the mortar shape. Mission oil (lubricating oil) in the oil pan 43 is drawn up from the suction unit 45 by the gear pump 47. The mission oil is then supplied to the upper oil pan 44 through the oil filter 46 and the mission oil cooler 48. The upper oil accumulator 44 sprays the supplied mission oil from a lower nozzle 49 in a downward direction with an oil level kept constant. As a result, the engagement portion of the gear mechanism is lubricated, and the frictional heat generated by the engagement of the gear mechanism is absorbed. This prevents the temperature of the gear mechanism from increasing. The mission oil after the lubrication returns to the oil pan 43, and is then drawn up by the gear pump 47 again so that the mission oil circulates. In addition, the mission oil is cooled by the mission oil cooler 48 so that the temperature of the mission oil is properly kept as the lubricating oil. The gear pump 47 is also driven by the engine 40.

A temperature sensor 51 for measuring the temperature of the mission oil is disposed on a pipe on the outlet side of the gear pump 47. A temperature sensor 52 for measuring the temperature of the mission oil on the inlet side of the mission oil cooler 48, and a temperature sensor 53 for measuring the temperature of the mission oil on the outlet side of the mission oil cooler 48, are disposed on pipes on the inlet and outlet sides of the mission oil cooler 48 respectively. Detection signals from the temperature sensors 51 through 53 are inputted into the hydraulic system measurement unit 24 shown in FIG. 18.

Figure 20:
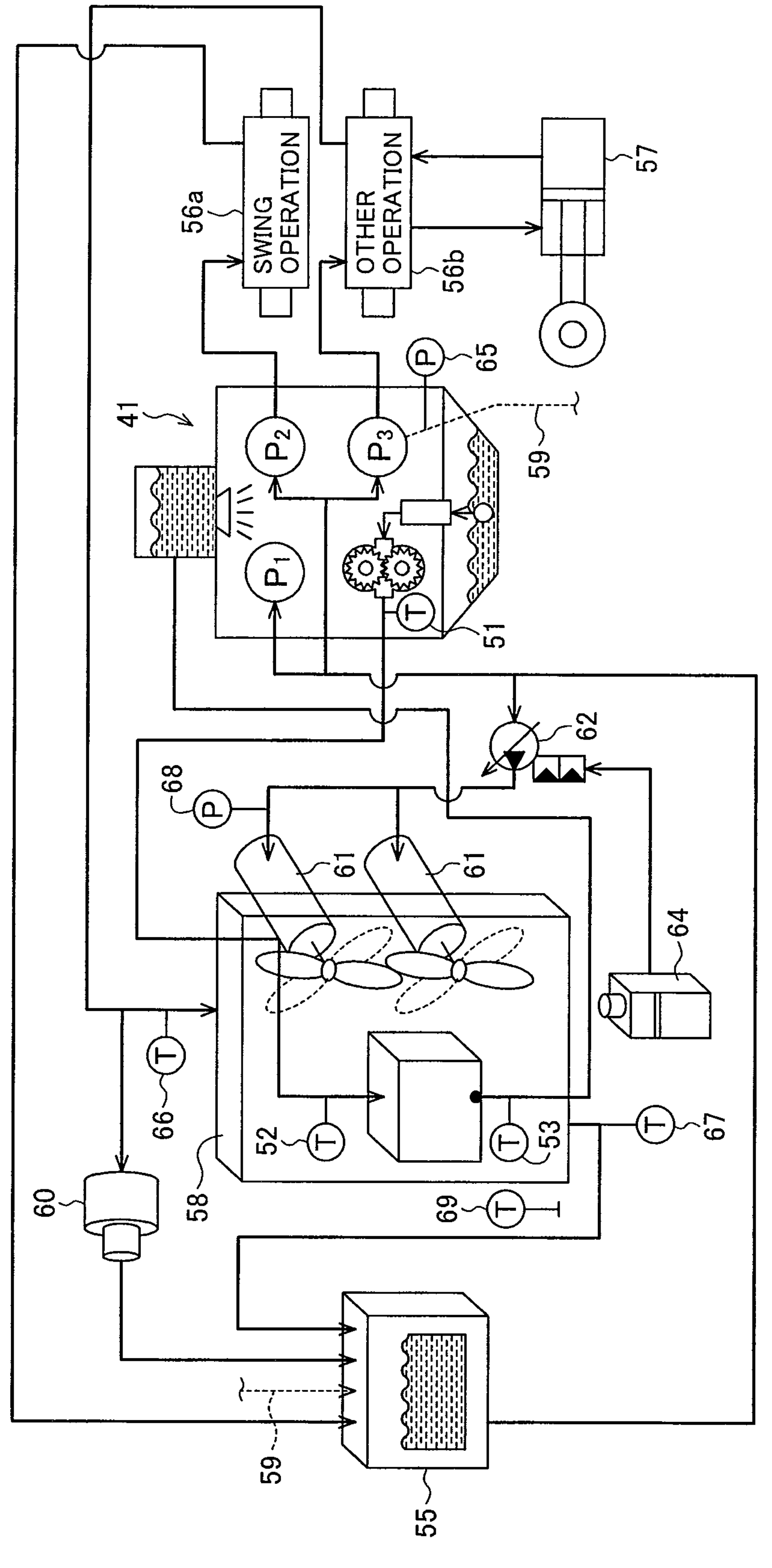
FIG. 20 is a diagram schematically illustrating a mission oil cooling system and a hydraulic operating fluid cooling system accompanying with a hydraulic system and a pump mission unit.

FIG. 20 is a diagram schematically illustrating a mission oil cooling system and a hydraulic operating fluid cooling system, accompanying with a hydraulic system and a pump mission unit.

The hydraulic system with which the hydraulic excavator 1 is equipped includes: a plurality of main pumps including the above-described pumps P1, P2, P3; a tank 55; a plurality of control valves (typically denoted by reference numerals 56*a*, 56*b*); a boom cylinder 6*a*; an arm cylinder 7*a*; a bucket cylinder 8; a plurality of actuators including swing-motion motors (typically denoted by a reference numeral 57); and a hydraulic operating fluid cooler 58. The hydraulic operating fluid in the tank 55 is drawn up by the plurality of main pumps including the pumps P1, P2, P3, and then supplied to the plurality of control valves including the control valves 56*a*, 56*b*. The plurality of control valves adjust the flow rate and direction of the hydraulic operating fluid, and then supply the hydraulic operating fluid to the plurality of actuators 57. Return fluid from the actuators 57 is returned to the tank 55 through the plurality of control valves including the control valves 56*a*, 56*b*. In this case, the hydraulic operating fluid passing through some (for example, the control valve 56*a*) of the plurality of control valves is directly returned to the tank 55. In contrast, the hydraulic operating fluid passing through the other control valves (for example, the control valve 56*b*) is transferred to the hydraulic operating fluid cooler 58 where the hydraulic operating fluid is cooled and then returned to the tank 55. In addition, the plurality of main pumps including the pumps P1, P2, P3 perform self-lubrication (lubrication of a sliding portion) with internally draining hydraulic operating fluid (internal draining fluid). As typically shown with the pump P3, the internal draining fluid is returned to the tank 55 through a drain pipe 59 from a drain hole provided at the lower part of the pump P3. The inlet side of the hydraulic operating fluid cooler 58 is connected to the tank 55 through a safety valve (relief valve) 60. At the time of excessive pressure drop buildup in the hydraulic operating fluid cooler 58, for the protection of the hydraulic operating fluid cooler 58, the hydraulic operating fluid on the inlet side of the hydraulic operating fluid cooler 58 bypasses the hydraulic operating fluid cooler 58 so that the hydraulic operating fluid is directly returned to the tank 55 through the safety valve 60.

The mission oil cooler 48 and the hydraulic operating fluid cooler 58 are cooled by the cooling air generated by the rotation of fan motors 61. As a result, the mission oil and the hydraulic operating fluid, which flow through the mission oil cooler 48 and the hydraulic operating fluid cooler 58, are cooled respectively. The fan motors 61 are driven rotatively with discharged oil from an auxiliary pump 62. The auxiliary pump 62 is controlled by a solenoid valve 64 and controls the revolution speed of the fan motors 63 so that the temperature of the mission oil and that of the hydraulic operating fluid are kept within a proper temperature range. The auxiliary pump 62 is also driven by the engine 40.

As typically shown with the pump P3, a pressure sensor 65 for measuring the drain pressure in a pump case is disposed at a drain hole of each of the plurality of main pumps including the pumps P1, P2, P3. A temperature sensor 66 for measuring the temperature of the hydraulic operating fluid on the inlet side of the hydraulic operating fluid cooler 58, and a temperature sensor 67 for measuring the temperature of the hydraulic operating fluid on the outlet side of the hydraulic operating fluid cooler 58, are provided on pipes on the inlet and outlet sides of the hydraulic operating fluid cooler 58 respectively. A pressure sensor 68 for measuring the motor inlet pressure is disposed on the hydraulic-operating-fluid inlet side of the fan motor 63. A temperature sensor 69 for measuring the front air temperature (the outdoor air temperature) of the hydraulic operating fluid cooler is disposed on the whole surface of the hydraulic operating fluid cooler 58. Detection signals from these sensors 65 through 69 are also inputted into the hydraulic system measurement unit 24 shown in FIG. 18.

Figure 21:
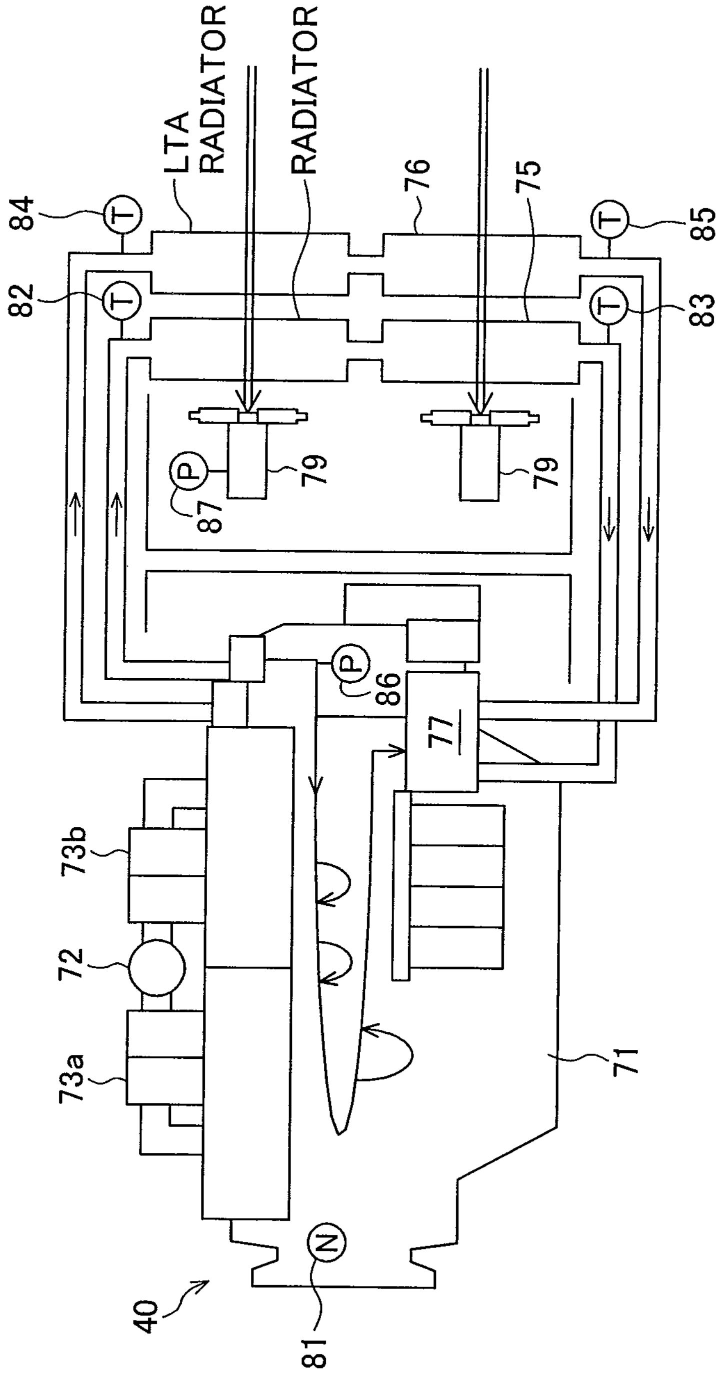
FIG. 21 is a diagram illustrating an engine, and a cooling system thereof.

FIG. 21 is a diagram illustrating an engine, and a cooling system thereof. The engine 40 is equipped with a turbocharger 72 and after-coolers 73*a*, 73*b*, on the upper part of the engine main body 71. Air supercharged by the turbocharger 72 is cooled by the after-coolers 73*a*, 73*b* and then supplied to each cylinder through each intake manifold. An engine cooling system includes two radiators: a radiator 75, and a low temperature after-cooler radiator (LTA radiator) 76. The radiator 75 cools engine cooling water so that the engine main body is cooled. The LTA radiator 76 cools coolant of the after-coolers 73*a*, 73*b* so that air taken into each cylinder of the engine 40 is cooled. As a circulating system for circulating coolant of the radiator 75 and that of LTA radiator 76, a common coolant pump 77 is disposed. In addition, the radiator 75 and the LTA radiator 76 are located in forward and backward rows in alignment. As is the case with the mission oil cooler 48 and the hydraulic operating fluid cooler 58, the radiator 75 and the LTA radiator 76 are cooled by the cooling air generated by the rotation of fan motors 79 used for the radiators. As a result, the coolant flowing through the radiator 75 and the LTA radiator 76 is cooled. As is the case with the fan motors 63 for the oil cooler, the fan motors 79 are driven rotatively with discharged oil from an unillustrated auxiliary pump.

The engine main body 71 is provided with a revolution speed sensor 81 for measuring the engine speed. The pipes on the inlet and outlet sides of the radiator 75 are provided with a temperature sensor 82 for measuring the temperature of the coolant on the inlet side of the radiator 75, and a temperature sensor 83 for measuring the temperature of the coolant on the outlet side of the radiator 75 respectively. The pipes on the inlet and outlet sides of the LTA radiator 76 are provided with a temperature sensor 84 for measuring the temperature of the coolant on the inlet side of the LTA radiator 76, and a temperature sensor 85 for measuring the temperature of the coolant on the outlet side of the LTA radiator 76 respectively. A pressure sensor 86 for measuring the supply pressure of coolant is disposed at a coolant path of the engine main body 71. A pressure sensor 87 for measuring the motor inlet pressure is disposed on the hydraulic-operating-fluid inlet side of the fan motor 79. Detection signals from these sensors 81 through 87 are also inputted into the engine measurement unit 25 shown in FIG. 18.

Returning to FIG. 17, tilt sensor 89 is disposed at proper position of the swing body 3 of the hydraulic excavator 1. Detection signal by the tilt sensor 89 is inputted into the vehicle body controller 22 shown in FIG. 18.

Figure 22:
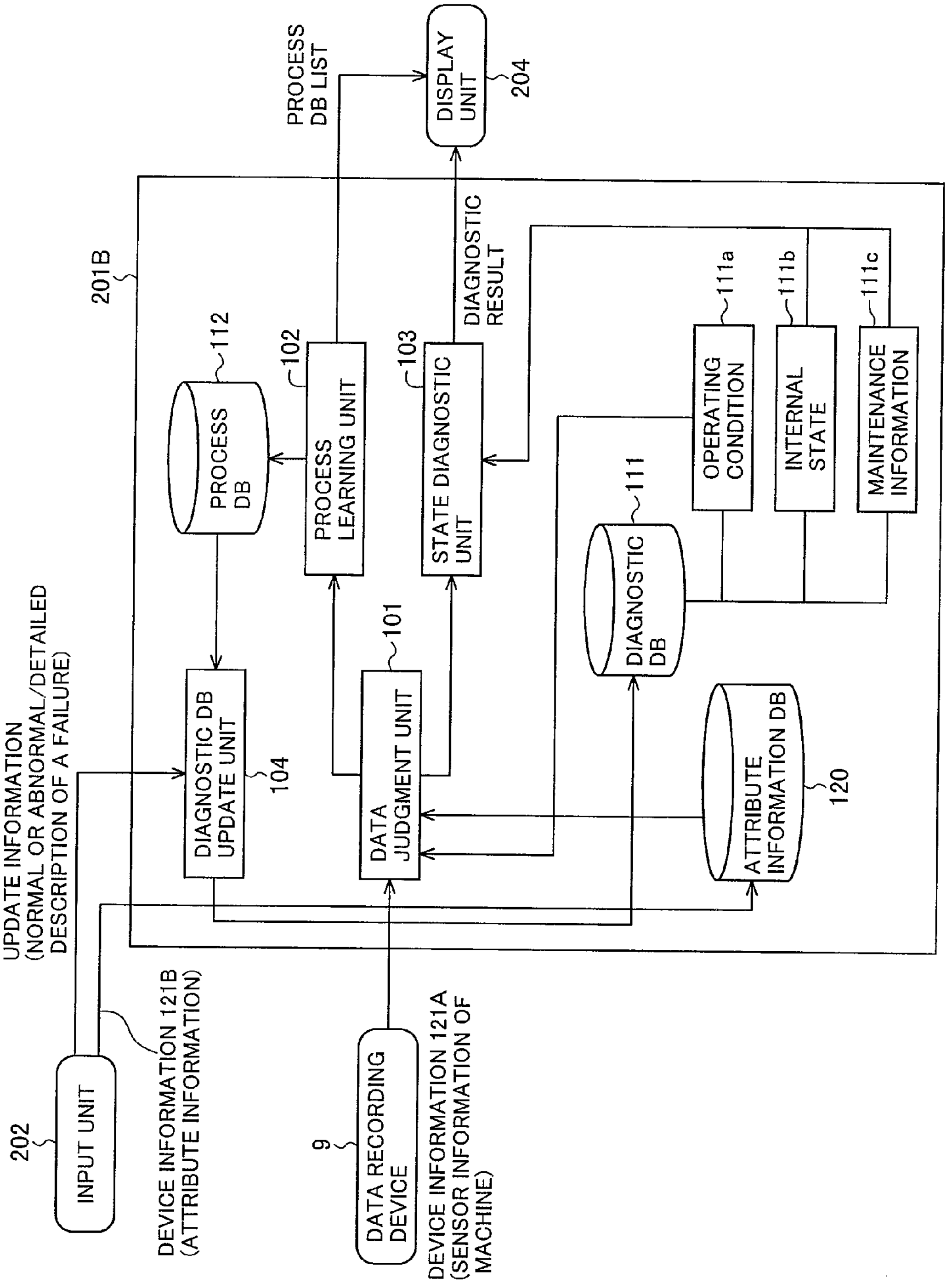
FIG. 22 is a diagram illustrating a configuration of a device diagnostic apparatus included in the device diagnostic system according to the embodiment of the present invention shown in FIG. 17.

FIG. 22 is a diagram illustrating a configuration of the device diagnostic apparatus 201B. The configuration of the device diagnostic apparatus 201B is substantially the same as that of the device diagnostic apparatus 201 according to the first embodiment shown in FIG. 1 except the following points:

(1) The device diagnostic apparatus 201B further includes an attribute information database 120. The attribute information database 120 stores device information 121B that is device information other than measured values acquired by the sensors, and that is used as attribute information manually inputted by the user of the system shown in FIG. 17 through input units such as the mouse 11C and the keyboard 11D.

(2) When the data judgment unit 101 receives the device information 121A downloaded from the data recording device 9, the data judgment unit 101 concurrently reads the device information 121B stored in the attribute information database 120, and then make a judgment using the device information 121A, 121B.

(3) An ID number for identifying the hydraulic excavator 1 (working machine) is given to each of the device information 121A download from the data recording device 9 and the device information (attribute information) 121B stored in the attribute information database 120. After the data judgment unit 101 receives or reads these pieces of device information 121A, 121B, the data judgment unit 101 stores the pieces of device information 121A, 121B in its own buffer (not illustrated) together with the ID numbers thereof.

(4) In addition, a category of a target device to be diagnosed by the device diagnostic apparatus 201B, and categories of internal state information and operating condition information which are used for the diagnosis of the target device are defined beforehand based on a category of the working machine. When the data judgment unit 101 receives or reads the pieces of device information 121A, 121B to store them in the buffer, the data judgment unit 101 selects related device information, and reads it from the buffer, and then performs data judgment, on a target device basis. In this case, when a plurality of pieces of internal state information to be compared and judged exist in one target device, operating condition information is selected to read data and perform data judgment on an internal state information basis. In addition, when a plurality of pieces of operating condition information to be compared and judged exist in one internal state information, data judgment is performed on an operating condition information basis.

(5) Corresponding to the data judgment by the data judgment unit 101 described in the above item (4), each of the state diagnostic unit 103 and the process learning unit 102 also performs processing on a target device basis, on an internal state information basis, and on an operating condition information basis.

(6) The internal state information is stored in the diagnostic database 111 on a working machine basis, on a target device basis, and on an internal state information basis with the operating condition information and the maintenance information associated with. Accordingly, the diagnostic database update unit 104 updates diagnostic data on a working machine basis, on a target device basis, and on an internal state information basis.

Specific examples of the device diagnosis for the preventive maintenance will be described below by taking the pump mission unit 41, the mission oil cooler 48, the hydraulic operating fluid cooler 58, the main pump P3, the engine 40, and the radiators 75, 76 as examples of a target device.

(1) A Case where a Target Device is the Pump Mission Unit 41

When a target device is the pump mission unit 41, internal state information to be compared and judged includes the temperature of mission oil (a measured value acquired by the temperature sensor 53), and a deterioration level of the mission oil (a manually inputted value, or a periodically sampled or measured value).

When internal state information is the temperature of the mission oil, operating condition information to be compared and judged relating to the internal state information includes the following:

- the outdoor air temperature (a measured value acquired by the temperature sensor 69);
- an oil grade (a manually inputted value or a measured value);
- road surface data (tilt angle) (a measured value by the tilt sensor 89)+model data (a shape of the oil pan 43; attribute information; a manually inputted value);
- a maintenance person data or driver data (attribute information; a manually inputted value);
- a deterioration level of the mission oil (attribute information; a manually inputted value; a periodically sampled or measured value); and
- the performance of the mission oil cooler 48 (a diagnosed value)

In addition, maintenance information in the above case indicates, for example, whether or not the maintenance and inspection of the pump mission unit 41 is required (for example, disassembling inspection).

When the internal state information is the deterioration level of the mission oil, operating condition information to be compared and judged relating to the internal state information includes the following:

- work site data (attribute information; a manually inputted value); and
- weather data (attribute information; a manually inputted value)

In addition, maintenance information in the above case indicates, for example, whether or not the replacement of the mission oil is required.

When the target device is the pump mission unit 41, in the event that an abnormal state such as abrasion of a bearing of a gear occurs and the frictional resistance of the gear increases to generate frictional heat, the temperature of the mission oil increases. Therefore, whether or not an abnormal state of the pump mission unit 41 has occurred can be diagnosed by monitoring the change in oil temperature of the mission oil. The temperature of the mission oil, however, changes not only due to an abnormal state of the pump mission unit 41, but also due to other factors including: outdoor air temperature; a road surface situation (tilt angle of a vehicle body); whether or not the quantity of oil filled by a maintenance person is large or small; how the hydraulic excavator is used by a driver; performance of the mission oil cooler 48; and the like. In addition, a degree of change in oil temperature of the mission oil caused by the abnormal state of the pump mission unit 41 varies depending on an oil grade, a model of machine (a shape of the oil pan 43), a deterioration level of the mission oil, and the like.

For example, heat balance of a system associated with the mission oil (balance between the amount of heat applied by the pump mission unit 41 and the amount of heat taken by the oil cooler 48) is influenced by the outdoor air temperature. The increase in outdoor air temperature changes the heat balance. As a result, the temperature of the mission oil increases. Therefore, in order to correctly diagnose an abnormal state of the pump mission unit 41 on the basis of the temperature of the mission oil, it is necessary to check also the outdoor air temperature.

The cooling capability differs also depending on an oil grade (for example, depending on whether or not the oil grade is No. 30 or No. 40). This influences the temperature of the mission oil. Therefore, in order to make a correct diagnosis, it is necessary to check also the oil grade.

When a road surface tilts, the vehicle body also tilts in response to the tilt. In this case, a position of an oil surface with respect to the suction unit 45 in the oil pan 43 also changes. As a result, the amount of the mission oil drawn up by the gear pump 47 also changes. This causes the temperature of the mission oil to change. A degree of the influence of the tilt differs depending on a shape of the oil pan 43. When the oil pan 43 has a flat shape, the degree of the influence is larger than that in a case where the oil pan 43 has a mortar shape. Therefore, also in this case, in order to make a correct diagnosis, it is necessary to check also the tilt angle of the road surface, accompanying with the model of machine.

The amount of oil (an oil level) to be filled into the pump mission unit 41 should be proper. The proper amount is necessary to prevent the lower end of a gear of the pump mission unit 41 from soaking into the oil surface of the mission oil. When the lower end of the gear of the pump mission unit 41 soaks into the oil surface of the mission oil, the gear stirs the mission oil, causing the oil temperature to increase. On the other hand, not all maintenance persons know the proper amount of mission oil but, in some cases, some maintenance persons believe that the greater amount of oil can achieve a higher cooling effect. Moreover, how the hydraulic excavator 1 is used is often based on a habit of a driver (operator). For example, in a case where the frequency of heavy excavating work is high, a load of the pump mission unit 41 increases to increase the temperature of the mission oil. Therefore, in order to avoid the influence described above, it is necessary to check also the maintenance person data or the driver data.

The cooling capability of the mission oil is influenced by the deterioration level of the mission oil and the performance of the mission oil cooler 48. Therefore, in order to avoid the influence described above, it is necessary to check also these data. The performance of the mission oil cooler 48 is included in the diagnostic result in a case where a target device is the mission oil cooler 48 (described later).

Thus, when the temperature of the mission oil is the internal state information, the outdoor air temperature, road surface data (tilt angle of the vehicle body), maintenance person data and driver data, the performance of the mission oil cooler 48, an oil grade, a model (a shape of the oil pan 43), a deterioration level of the mission oil, and the like, are judged and diagnosed as operating condition information. As a result, an abnormal state of the pump mission unit 41 is correctly judged. This makes it possible to correctly estimate whether or not the maintenance and inspection of the pump mission unit 41 is required.

In addition, if the deterioration level of the mission oil exceeds a certain value, replacement of the mission oil is required. Therefore, it is necessary to periodically perform sampling of the mission oil so as to check the deterioration level thereof. It is expected that a sensor for measuring a deterioration level of the mission oil will be put to practical use in future. The deterioration of the mission oil is caused by hydrochloric oxidation, total oxidation, inclusion of water, mixture of silica particles, and the like. These causes are influenced by an environment of a work site. For example, if the work site is located in a wetland, or if work is carried out in a rainy season, increased water content causes the deterioration speed of the mission oil to become faster. Therefore, when whether or not the replacement of the mission oil is required is estimated from a current deterioration level of the mission oil (internal state information), environment data such as work site data and weather data as operating condition information and, at the same time, environmental information corresponding to them needs to be checked. To be more specific, when the temperature of the mission oil is used as internal state information, the deterioration level of the mission oil becomes one piece of operating condition information. In contrast, when an estimation is made as to whether or not the replacement of the mission oil is required, the deterioration level of the mission oil becomes internal state information.

Thus, when the deterioration level of the mission oil is used as internal state information, judgment and diagnosis are performed with environment data such as work site data and weather data used as operating condition information. This makes it possible to correctly judge an abnormal state of the mission oil, and to correctly estimate whether or not the replacement of the mission oil is required.

The diagnostic database 111 stores the temperature of the mission oil (internal state information) with operating condition information associated with. The operating condition information includes outdoor air temperature, road surface data (tilt angle of the vehicle body), maintenance person data and driver data, the performance of the mission oil cooler 48, an oil grade, a model (a shape of the oil pan 43), and a deterioration level of the mission oil. The diagnostic database 111 stores a deterioration level of the mission oil (internal state information) with operating condition information including work site data and weather data associated with. In addition, the diagnostic database update unit 104 updates the diagnostic data in the diagnostic database 111 with the temperature of the mission oil (internal state information) associated with operating condition information including outdoor air temperature, road surface data (tilt angle of the vehicle body), maintenance person data and driver data, the performance of the mission oil cooler 48, an oil grade, a model (a shape of the oil pan 43), and a deterioration level of the mission oil. Further, the diagnostic database update unit 104 updates the diagnostic data in the diagnostic database 111 with the deterioration level of the mission oil (internal state information) associated with operating condition information including work site data and weather data, and associated with the maintenance information.

(2) In a Case where a Target Device is the Mission Oil Cooler 48

When a target device is the mission oil cooler 48, internal state information to be compared and judged includes the difference in temperature between the inlet and outlet of the mission oil cooler 48 (in other words, the difference in measured value between the temperature sensors 52 and 53), and operating condition information to be compared and judged relating to the internal state information includes the following:

the outdoor air temperature (a measured value acquired by the temperature sensor 69);

work site data (a manually inputted value);

whether or not a cooler option (a sound absorbing duct) is provided (a manually inputted value); and the revolution speed of the fan motor 63 (the inlet pressure of the hydraulic operating fluid; a measured value by the pressure sensor 68)

Maintenance information in the above case indicates whether or not cleaning of the mission oil cooler 48 is required.

When the target device is the mission oil cooler 48, in the event that a malfunction (abnormal state) occurs (for example, if a large amount of dust adheres to a radiation fin), the cooling capability deteriorates. The amount of adhered dust tends to increase particularly when the radiation fin is a Colgate type radiation fin. When the cooling capability of the mission oil cooler 48 decreases, the difference in temperature between the inlet and outlet of the mission oil cooler 48 increases. Therefore, an abnormal state of the mission oil cooler 48 (for example, adhesion of a large amount of dust) can be diagnosed by monitoring the difference in temperature between the inlet and outlet of the mission oil cooler 48. However, the difference in temperature between the inlet and outlet of the mission oil cooler 48 is changed not only due to an abnormal state of the mission oil cooler 48 but also due to other factors including: outdoor air temperature; a situation of a work site; whether or not a cooler option (a sound absorbing duct) is provided; and the revolution speed of the fan motor 63.

For example, as the outdoor air temperature increases, the amount of heat released from the mission oil cooler 48 changes. As a result, the difference in temperature between the inlet and outlet of the mission oil cooler 48 changes. Therefore, in order to correctly diagnose an abnormal state of the mission oil cooler 48 on the basis of the difference in temperature between the inlet and outlet of the mission oil cooler 48, it is necessary to check also the outdoor air temperature.

In addition, the amount of dust adhered to the radiation fin changes depending on a surrounding environment of a work site. For example, when a work site is a gold mine in which lime is used, lime being often used in a gold mine for the purpose of extracting gold, the amount of dust adhered to the radiation fin increases. In such a case, therefore, the amount of adhered dust exerts a large influence on the change in difference in temperature between the inlet and outlet of the mission oil cooler 48. Accordingly, in order to correctly diagnose an abnormal state of the mission oil cooler 48 on the basis of the difference in temperature between the inlet and outlet of the mission oil cooler 48, it is necessary to check also the situation of the work site.

Depending on a user of a hydraulic excavator, the user may provide a sound absorbing duct at a position adjacent to the mission oil cooler 48 for the purpose of reducing noises. In this case, the sound absorbing duct becomes an obstructive factor, which causes the quantity of air passing through the mission oil cooler 48 to decrease. As a result, the difference in temperature between the inlet and outlet of the mission oil cooler 48 increases. Therefore, in order to correctly diagnose an abnormal state of the mission oil cooler 48 on the basis of the difference in temperature between the inlet and outlet of the mission oil cooler 48, it is necessary to check also whether or not an option such as the sound absorbing duct exists.

Moreover, the difference in temperature between the inlet and outlet of the mission oil cooler 48 also changes depending on the revolution speed of the fan motor 63. The revolution speed of the fan motor 63 is roughly proportional to the inlet pressure of the hydraulic operating fluid of the fan motor 63. Accordingly, the revolution speed of the fan motor 63 can be estimated by detecting the inlet pressure. Therefore, in order to correctly diagnose an abnormal state of the mission oil cooler 48 on the basis of the difference in temperature between the inlet and outlet of the mission oil cooler 48, it is necessary to check also the inlet pressure of the hydraulic operating fluid of the fan motor 63 (the revolution speed of the fan motor).

Thus, in the case where the difference in temperature between the inlet and outlet of the mission oil cooler 48 is used as internal state information, judgment and diagnosis are performed by using the information about, as operating condition information, outdoor air temperature, a situation of a work site, whether or not a cooler option (sound absorbing duct) is provided, the revolution speed of the fan motor 63, and the like. This makes it possible to correctly judge an abnormal state of the mission oil cooler 48, and to correctly estimate whether or not cleaning of the mission oil cooler 48 is required.

The diagnostic database 111 stores the difference in temperature between the inlet and outlet of the mission oil cooler 48 (internal state information) with the operating condition information such as outdoor air temperature, work site data, whether or not a cooler option (sound absorbing duct) is provided, and the inlet pressure of the hydraulic operating fluid of the fan motor 63 (the revolution speed of the fan motor) associated with. In addition, the diagnostic database update unit 104 updates diagnostic data in the diagnostic database 111 with the difference in temperature between the inlet and outlet of the mission oil cooler 48 (internal state information) associated with the operating condition information such as outdoor air temperature, work site data, whether or not an cooler option (sound absorbing duct) is provided, and the inlet pressure of the hydraulic operating fluid of the fan motor 63 (the revolution speed of the fan motor) and associated with the maintenance information.

(3) In a Case where a Target Device is the Hydraulic Operating Fluid Cooler 58

When a target device is the hydraulic operating fluid cooler 58, internal state information to be compared and judged includes the difference in temperature between the inlet and outlet of the hydraulic operating fluid cooler 58 (a difference in measured value between the temperature sensors 66, 67), and operating condition information to be compared and judged relating to the internal state information includes the following:

- the outdoor air temperature (a measured value acquired by the temperature sensor 69);
- work site data (a manually inputted value);
- whether or not a cooler option (a sound absorbing duct) is provided (a manually inputted value); and
- the revolution speed of the fan motor 63 (the inlet pressure of the hydraulic operating fluid; a measured value by the pressure sensor 68)

Maintenance information in the above case indicates whether or not cleaning of the hydraulic operating fluid cooler 58 is required.

When the target device is the hydraulic operating fluid cooler 58, the reason why an abnormal state of the hydraulic operating fluid cooler 58 (for example, a large amount of adhered dust) can be diagnosed by using the information about, as internal state information, the difference in temperature between the inlet and outlet of the hydraulic operating fluid cooler 58, and in this case, the reason why an abnormal state of the hydraulic operating fluid cooler 58 can be correctly diagnosed by checking also, as operating condition information, outdoor air temperature, work site data, whether or not an cooler option (sound absorbing duct) is provided, and the revolution speed of the fan motor 63 (the inlet pressure of the hydraulic operating fluid), are the same as those in the case where the target device is the mission oil cooler 48.

The diagnostic database 111 stores the difference in temperature between the inlet and outlet of the hydraulic operating fluid cooler 58 (internal state information) with the operating condition information such as outdoor air temperature, work site data, whether or not a cooler option (sound absorbing duct) is provided, and the inlet pressure of the hydraulic operating fluid of the fan motor 63 (the revolution speed of the fan motor) associated with. In addition, the diagnostic database update unit 104 updates diagnostic data in the diagnostic database 111 with the difference in temperature between the inlet and outlet of the hydraulic operating fluid cooler 58 (internal state information) associated with the operating condition information such as outdoor air temperature, work site data, whether or not an cooler option (sound absorbing duct) is provided, and the inlet pressure of the hydraulic operating fluid of the fan motor 63 (the revolution speed of the fan motor) and associated with the maintenance information.

(4) In a Case where a Target Device is the Main Pump P3

When a target device is the main pump P3, internal state information to be compared and judged includes the amount of internal leakage (a measured value of the pressure sensor 65), and operating condition information to be compared and judged relating to the internal state information includes the following:

- operation data (a measured value of an operation signal of the electric lever units 29A, 29B)+model of machine (attribute information; a manually inputted value);
- the outdoor air temperature (a measured value acquired by the temperature sensor 69); and
- oil grade of the hydraulic operating fluid (a manually inputted value or a measured value)

Maintenance information in the above case indicates whether or not replacement of a pump part is required.

As described above, in the case where the large-size hydraulic excavator 1 is used, one engine 40 drives, for example, four main pumps, and discharged oil from these main pumps drives actuators including the boom cylinder 6*a*, the arm cylinder 7*a*, and the bucket cylinder 8. Usually, three main pumps among the four main pumps are driven at the maximum discharge amount with the displacement volume (a tilting angle of a swash plate) maximized and the displacement volume (the tilting angle of the swash plate) of the remaining one main pump is adjusted by a specific operation signal (specific operation) of the electric lever units 29A, 29B so that the discharge amount is adjusted. As described above, the main pump P3 corresponds to a hydraulic pump whose discharge amount is adjusted in that manner. The main pump P3, therefore, in particular requires the maintenance and inspection higher in comparison with other pumps because abrasion of parts such as a swash plate, a piston, and a cylinder is faster.

With the progress of the abrasion of parts such as a swash plate, the amount of internal leakage in the main pump P3 increases. This causes the performance of the main pump P3 to deteriorate. Therefore, an abnormal state of the main pump P3 (an increase in abrasion of parts) can be diagnosed by monitoring the amount of internal leakage in the main pump P3. However, the increase in the amount of internal leakage of the main pump P3 occurs not only by the abrasion of the parts of the main pump P3, but also by other factors including operation data, a model of machine, the outdoor air temperature, and an oil grade of the hydraulic operating fluid.

For example, the amount of abrasion of the parts of the main pump P3 differs between a work site at which the frequency of appearance of specific operation for decreasing the discharge amount from the main pump P3 is higher and a work site at which the frequency of appearance of the specific operation in question is lower. An increasing rate of the amount of internal leakage in the main pump P3 is higher in the work site at which the frequency of appearance of the specific operation in question is higher. In addition, the frequency of appearance of the specific operation in question differs between a case where the hydraulic excavator 1 is a backhoe type shovel (shown in FIG. 17) and a case where the hydraulic excavator 1 is a loader type shovel. In the case where the hydraulic excavator 1 is a backhoe type shovel, the specific operation in question is only arm dump operation. However, in the case where the hydraulic excavator 1 is a loader type shovel, the specific operation in question includes arm dump operation and arm crowd operation. Therefore, in order to correctly diagnose an abnormal state of the main pump P3 on the basis of the amount of internal leakage in the main pump P3, it is necessary to check also the frequency of appearance of the specific operation in question, and a model of the hydraulic excavator.

In addition, the outdoor air temperature and an oil grade also cause the viscosity and lubrication property of the hydraulic operating fluid to change. As a result, the amount of internal leakage changes. Therefore, in order to correctly diagnose an abnormal state of the main pump P3 on the basis of the amount of internal leakage of the main pump P3, it is necessary to check also the outdoor air temperature and the oil grade.

Thus, in the case where the amount of internal leakage in the main pump P3 is used as internal state information, judgment and diagnosis are performed by using the information about, as operating condition information, operation data, a model, the outdoor air temperature, an oil grade of the hydraulic operating fluid, and the like. This makes it possible to correctly judge an abnormal state of the main pump P3, and to correctly estimate whether or not replacement of a pump part is required.

The diagnostic database 111 stores the amount of internal leakage in the main pump P3 (internal state information) with the operating condition information such as operation data, a model of machine, outdoor air temperature, and an oil grade of the hydraulic operating fluid associated with. In addition, the diagnostic database update unit 104 updates diagnostic data in the diagnostic database 111 with the amount of internal leakage in the main pump P3 (internal state information) associated with the operating condition information such as operation data, a model of machine, outdoor air temperature, and an oil grade of the hydraulic operating fluid, and associated with the maintenance information.

It is to be noted that identical data can also be used for the other main pumps including the main pumps P1, P2 to carry out identical diagnosis. Moreover, in the case where a target device is a pump, an abnormal state of the pump can be diagnosed by using, as internal state information, sound data and vibration data, of the pump, and by using environment data, as operating condition information, relating to sound or vibrations.

(5) In a Case where a Target Device is the Engine

When a target device is the engine 40, internal state information to be compared and judged includes the engine speed (a measured value of the revolution speed sensor 81), and operating condition information to be compared and judged relating to the internal state information includes the following:

- an altitude (atmospheric pressure) (a measured value);
- a fuel grade (a manually inputted value);
- an engine oil grade (a manually inputted value); and
- a pump condition (a change in load of the engine; a calculated value)

Maintenance information in the above case indicates whether or not the maintenance and inspection of the engine 40 (for example, disassembling inspection) is required.

When the performance of the engine 40 deteriorates, the speed of the engine 40 decreases. Therefore, monitoring of the engine speed makes it possible to diagnose deterioration in performance (an abnormal state) of the engine 40. However, the decrease in engine speed depends not only on the deterioration in performance of the engine but also on an altitude (atmospheric pressure), a fuel grade, an engine oil grade, and a condition of a hydraulic pump that is an engine load, and the like. Therefore, when an abnormal state of the engine 40 is diagnosed by using the engine speed as internal state information, it is necessary to check, as operating condition information, an altitude (atmospheric pressure), a fuel grade, an engine oil grade, a condition of a hydraulic pump that is an engine load, and the like. This makes it possible to correctly judge an abnormal state of the engine 40, and to correctly estimate whether or not the maintenance and inspection of the engine 40 is required.

The diagnostic database 111 stores the engine speed (internal state information) with operating conditions such as an altitude (atmospheric pressure), a fuel grade, an engine oil grade, and a condition of a pump (a change in load of the engine) associated with. In addition, the diagnostic database update unit 104 updates diagnostic data in the diagnostic database 111 with the engine speed (internal state information) associated with operating conditions such as an altitude (atmospheric pressure), a fuel grade, an engine oil grade, and a condition of a pump (a change in load of the engine), and associated with the maintenance information.

Incidentally, in the case where the target device is the engine, an abnormal state of the engine can also be diagnosed by using fuel consumption data as internal state information, and by using, as operation condition information, an altitude (atmospheric pressure), a fuel grade, an engine oil grade, a condition of a pump (a change in load of the engine), and the like.

(6) In a Case where Target Devices are the Radiators

When target devices are the radiator 75 and the LTA radiator 76, internal state information to be compared and judged for each of the radiators includes the differences in temperature between the inlet and outlet of the radiator 75, and between the inlet and outlet of the LTA radiator 76, and operating condition information to be compared and judged relating to the internal state information includes the following:

- the outdoor air temperature (a measured value acquired by the temperature sensor 69);
- work site data (a manually inputted value);
- whether or not a radiator option (a sound absorbing duct) is provided (a manually inputted value);
- the revolution speed of the fan motor 69 (the inlet pressure of the hydraulic operating fluid; a measured value by the pressure sensor 87); and the performance of the coolant pump 77 (a measured value by the pressure sensor 86)

Maintenance information for the above case indicates whether or not of cleaning of the radiator 75 and/or the LTA radiator 76 is required.

In the case where the target devices are the radiator 75 and the LTA radiator 76, as is the case with the mission oil cooler 48 and the hydraulic operating fluid cooler 58, an abnormal state of the radiators 75, 76 (for example, adhesion of a large amount of dust) can be diagnosed by monitoring the difference in temperature between the inlet and outlet of the radiator 75, and the difference in temperature between the inlet and outlet of the LTA radiator 76 respectively. In addition, the difference in temperature between the inlet and outlet of each of the radiators 75, 76 changes due to other factors including: the outdoor air temperature; work site data; whether or not a radiator option (a sound absorbing duct) is provided; the revolution speed of the fan motor 69; and the performance of the coolant pump 77. Therefore, by checking also these factors as operating condition information, it is possible to correctly diagnose an abnormal state, and to correctly estimate whether or not cleaning of the radiator 75 and/or the LTA radiator 76 is required.

The diagnostic database 111 stores the difference in temperature between the inlet and outlet of each of the radiators 75, 76 (internal state information) with operating conditions such as outdoor air temperature, work site data, whether or not a radiator option (a sound absorbing duct) is provided, the revolution speed of the fan motor 69, and the performance of the coolant pump 77 associated with. In addition, the diagnostic database update unit 104 updates diagnostic data in the diagnostic database 111 with the difference in temperature between the inlet and outlet of each of the radiators 75, 76 (internal state information) associated with operating condition information such as outdoor air temperature, work site data, whether or not a radiator option (a sound absorbing duct) is provided, the revolution speed of the fan motor 69, and the performance of the coolant pump 77, and also associated with maintenance information.

Incidentally, in the above-described embodiments, the present invention is applied to the supersized hydraulic excavator (the backhoe type hydraulic excavator). However, the present invention can also be applied to other working machines equipped with a work device. The present invention can also be applied to, for example, a loader type hydraulic excavator, and a hydraulic excavator which is smaller in size than the supersized hydraulic excavator (for example, an ordinary large-size hydraulic excavator or a medium-size hydraulic excavator) in like manner. Moreover, the present invention can also be applied even to working machines (such as a wheel loader, a crane, and a bulldozer) other than hydraulic excavators in like manner.

The invention claimed is:

1. A device diagnostic apparatus for a working machine including a body and a work device provided on the body, the device diagnostic apparatus diagnosing at least one of a plurality of components, as a target device, included in the working machine, the apparatus comprising:

a data judgment unit configured to compare, when device information including operating condition information and internal state information is input, the operating condition information in the device information with operating condition information stored beforehand to judge whether or not both of the operating condition information agree with each other, and then output judgment result information, the operating condition information including external environment information of the target device and operation information of the target device that indicates operating conditions including environment and way under which the target device has been operated, and the internal state information including operation state information of the target device that indicates how the target device has been moved under the operating conditions of the operating condition information; and a state diagnosis unit configured to compare, when the judgment result information indicates that both of the operating condition information agree with each other, the internal state information in the device information with internal state information stored beforehand and associated with the stored operating condition information, and then output a result of the comparison.

2. The device diagnostic apparatus for the working machine according to claim 1, wherein said state diagnosis unit compares the internal state information in the device information with the internal state information stored beforehand to judge whether or not both of the internal state information agree with each other, and when the judgment result information indicates that both of the internal state information agree with each other, said state diagnosis unit outputs a diagnostic result on the basis of maintenance information corresponding to the internal state information stored beforehand, whereas when the judgment result information does not indicate that both of the internal state information agree with each other, said state diagnosis unit outputs a diagnostic result indicating that an abnormal state has occurred.

3. The device diagnostic apparatus for the working machine according to claim 1, wherein the operating condition information includes at least one of following information: temperature data, humidity data, weather data, road surface data, operation data, maintenance person data, driver data, model data, work site data, an oil grade, an oil deterioration level, and operation information of related equipment.

4. The device diagnostic apparatus for the working machine according to claim 1, wherein the internal state information includes at least one of following information: engine speed data, radiator water temperature data, oil temperature data, an oil deterioration level, the amount of internal leakage, fuel consumption data, sound data of the target device, and vibration data of the target device.

5. The device diagnostic apparatus for the working machine according to claim 1, the device diagnostic apparatus further comprising:

a process learning unit configured to learn, when the judgment result information output by said data judgment unit indicates that both of the operating condition information disagree with each other, the device information, and then store the learned device information in a process database as process learning information.

6. The device diagnostic apparatus for the working machine according to claim 5, the device diagnostic apparatus further comprising:

a diagnostic database update unit configured to detect whether or not the process database has been updated, and to output, when it is detected that the process database has been updated, process database update request information.

7. The device diagnostic apparatus for the working machine according to claim 1, the device diagnostic apparatus further comprising:

a diagnostic database including an operating condition data storage unit in which the operating condition information is stored, wherein said data judgment unit compares operating condition information in the input device information with the operating condition information stored in the operating condition data storage unit.

8. The device diagnostic apparatus for the working machine according to claim 1, the device diagnostic apparatus further comprising:

a diagnostic database including an internal state data storage unit in which the internal state information is stored, wherein said state diagnosis unit compares internal state information in the input device information with the internal state information stored in the internal state data storage unit.

9. A device diagnostic system for a working machine, the device diagnostic system comprising:

a device diagnostic apparatus according to claim 1; and a display unit for displaying the diagnostic result.

10. The device diagnostic system for the working machine according to claim 9, wherein said device diagnostic apparatus includes a process learning unit configured to learn, when the judgment result information output by the data judgment unit indicates disagreement of the operating condition information, the device information, and then store the learned device information in a process database as process learning information, and said display unit displays the process learning information stored in the process database.

11. The device diagnostic system for the working machine according to claim 10, wherein the process database stores the process learning information, and date data of the date on which the process learning information has been learned, with both of them associated with each other, and said display unit displays the process learning information, and the date data of the date on which the process learning information has been learned.

12. The device diagnostic system for the working machine according to claim 10, the device diagnostic system further comprising:

a maintenance information input unit configured to input maintenance information, wherein said device diagnostic apparatus includes a diagnostic database update unit configured to the process learning information from the process database to judge whether or not the maintenance information has been input from the maintenance information input unit, and to add when it is judged that the maintenance information has been input, the maintenance information to the read process learning information before storing the process learning information in a maintenance information data storage unit of the diagnostic database.

13. The device diagnostic system for the working machine according to claim 12, wherein the maintenance information indicates whether the target device is normal or abnormal.

14. The device diagnostic system for the working machine according to claim 13, wherein, when maintenance information input from the maintenance information input unit indicates an abnormal state, the diagnostic database update unit instructs said display unit to display a maintenance information input screen which prompts a user to input a detailed description of the abnormal state.

15. The device diagnostic system for the working machine according to claim 14, wherein the maintenance information input screen includes a field to be input by the user, as a failure period, a specified period starting from the time before a point of time at which abnormal change of the internal state information becomes largest, the specified period including the point of time in question.

16. The device diagnostic system for the working machine according to claim 9, wherein when the judgment result information output by the data judgment unit indicates disagreement of the operating condition information, said device diagnostic apparatus outputs a detailed descriptions of the abnormal state and disagreement to said display unit, and said display unit displays the detailed descriptions of the abnormal state and disagreement.

17. The device diagnostic system for the working machine according to claim 9, wherein when the plurality of pieces of device information have been input, in a case where pieces of operating condition information in the plurality of pieces of device information include operating condition information which is uncomparable with the operating condition information stored beforehand, the data judgment unit of said device diagnostic apparatus outputs, to said display unit, a detailed description of the abnormal state, and the uncomparable operating condition information, and said display unit displays the detailed description of the abnormal state and the uncomparable operating condition information.

* * * * *